United States Patent
Doddi et al.

(10) Patent No.: US 12,164,448 B2
(45) Date of Patent: Dec. 10, 2024

(54) MECHANISM TO REDUCE EXIT LATENCY FOR DEEPER POWER SAVING MODES L2 IN PCIe

(71) Applicant: QUALCOMM Incorporated, San Diego, CA (US)

(72) Inventors: Ravindranath Doddi, Hyderabad (IN); Santhosh Reddy Akavaram, Hyderabad (IN); Prakhar Srivastava, Lucknow (IN)

(73) Assignee: QUALCOMM Incorporated, San Diego, CA (US)

( * ) Notice: Subject to any disclaimer, the term of this patent is extended or adjusted under 35 U.S.C. 154(b) by 47 days.

(21) Appl. No.: 17/821,399

(22) Filed: Aug. 22, 2022

(65) Prior Publication Data

US 2024/0061795 A1    Feb. 22, 2024

(51) Int. Cl.
*G06F 13/00* (2006.01)
*G06F 13/16* (2006.01)

(52) U.S. Cl.
CPC .. *G06F 13/1694* (2013.01); *G06F 2213/0026* (2013.01)

(58) Field of Classification Search
CPC .............. G06F 13/1694; G06F 2213/0026
See application file for complete search history.

(56) References Cited

U.S. PATENT DOCUMENTS

| | | | | |
|---|---|---|---|---|
| 9,430,437 B1* | 8/2016 | Krishnan | ............ | G06F 13/4027 |
| 2010/0257390 A1* | 10/2010 | Okoge | ................. | G06F 1/3221 |
| | | | | 713/320 |
| 2014/0281668 A1* | 9/2014 | He | ........................ | G06F 1/3253 |
| | | | | 714/4.5 |
| 2014/0340134 A1* | 11/2014 | Shionoiri | ............. | H03K 3/0375 |
| | | | | 327/198 |
| 2015/0212755 A1* | 7/2015 | Asnaashari | ......... | G06F 11/1076 |
| | | | | 711/103 |
| 2018/0032349 A1* | 2/2018 | Bhimanadhuni | ..... | G06F 9/4406 |
| 2020/0310517 A1* | 10/2020 | Li | ........................ | G06F 1/3253 |
| 2022/0374384 A1* | 11/2022 | Jeon | .................... | G06F 13/4221 |

(Continued)

OTHER PUBLICATIONS

International Search Report and Written Opinion—PCT/US2023/028194—ISA/EPO—Oct. 5, 2023. 13 pages.

(Continued)

*Primary Examiner* — Henry Tsai
*Assistant Examiner* — Kim T Huynh
(74) *Attorney, Agent, or Firm* — The Marbury Law Group/Qualcomm

(57) ABSTRACT

Various embodiments include methods and devices for implementing a Peripheral Component Interconnect Express (PCIe) link state transition by a computing device. Embodiments may include comprising retrieving, by a PCIe controller, PCIe link configuration data from a memory for a PCIe link in a fast recovery low power state of a link training status and state machine (LTSSM), and re-initializing, by the PCIe controller, the PCIe link using the PCIe link configuration data retrieved from the memory. Embodiments may further include maintaining the PCIe link configuration data in the memory for the PCIe link in the fast recovery low power state of the LTSSM by providing auxiliary power to PCIe configuration registers for the PCIe controller.

28 Claims, 9 Drawing Sheets

(56) References Cited

U.S. PATENT DOCUMENTS

2023/0086027 A1* 3/2023 Pillai .................. G06F 11/0751
714/57

OTHER PUBLICATIONS

Kuhn D: "Method for Restoring PCI Express Device Function After Device is Restored to D0 State", ip.com, Ip.Com Inc., West Henrietta, NY, US, Sep. 8, 2009, 2 Pages, XP013134157, The Whole Document.
Solomon R: "PCI Express [Product Reviews]", IEEE Consumer Electronics Magazine, IEEE, Piscataway, NJ, USA, vol. 8, No. 3, May 1, 2019, 2 Pages, XP011718431, pp. 97-98, The Whole Document.

* cited by examiner

MECHANISM TO REDUCE EXIT LATENCY FOR DEEPER POWER SAVING MODES L2 IN PCIe

BACKGROUND

Peripheral Component Interconnect Express (PCIe) protocols support multiple link states at different power levels. The L2 link state, which is a link suspend/sleep state, is configured for power conservation compared to link states with greater power consumption, such as L0 link state (link active state) and L1 link state (link standby state). Transitions between different link states can have latency costs. L2 transitions are common in system design used to reduce power consumption in PCIe components. Each time a link transitions to the L2 link state to conserve power, a cost is incurred of greater latency to transition from the L2 link state back to a link state with greater power consumption. The exit latencies from the L2 link state to the L0 link state in the PCIe specification incurs a very high cost (in the order of ms), putting pressure on application design in terms of system responsiveness to mitigate these latencies.

SUMMARY

Various aspects of this disclosure provide methods include methods and apparatuses for implementing such methods for implementing Peripheral Component Interconnect Express (PCIe) link state transition. Various aspects may include retrieving, by a PCIe controller, PCIe link configuration data from a memory for a PCIe link in a fast recovery low power state of a link training status and state machine (LTSSM), and re-initializing, by the PCIe controller, the PCIe link using the PCIe link configuration data retrieved from the memory for the PCIe link.

In some aspects, re-initializing the PCIe link using the PCIe link configuration data retrieved from the memory for the PCIe link may include re-initializing the PCIe link in the recovery state of the LTSSM, in which the method may further include transitioning the PCIe link from the recovery state of the LTSSM to an active state of the LTSSM. Some aspects may further include maintaining the PCIe link configuration data in the memory for the PCIe link in the fast recovery low power state of the LTSSM by providing auxiliary power to PCIe configuration registers for the PCIe controller.

Some aspects may further include receiving, by the PCIe controller, a wake signal for the PCIe link in the fast recovery low power state of the LTSSM, monitoring, by the PCIe controller, for a power good signal configured to indicate a stable voltage for a main power source to the PCIe controller in response to receiving the wake signal, and receiving, by the PCIe controller, the power good signal, in which retrieving the PCIe link configuration data from the memory for the PCIe link in the fast recovery low power state of the LTSSM may include retrieving the PCIe link configuration data from the memory for the PCIe link in the fast recovery low power state of the LTSSM in response to receiving the power good signal.

Some aspects may further include receiving, by the PCIe controller, a low power state signal for the PCIe link in an active state for the LTSSM, checking a fast recovery low power state enable value for the PCIe controller configured to indicate whether the fast recovery low power state is enabled for the PCIe controller, and transitioning the PCIe link in the active state for the LTSSM to the PCIe link in the fast recovery low power state for the LTSSM in response to the fast recovery low power state enable value for the PCIe controller indicating that the fast recovery low power state is enabled for the Some aspects may further include maintaining the PCIe link configuration data in the memory for the PCIe link in the fast recovery low power state of the LTSSM by providing auxiliary power to PCIe configuration registers for the PCIe controller in response to the fast recovery low power state enable value for the PCIe controller indicating that the fast recovery low power state is enabled for the PCIe controller.

Various aspects may include a Peripheral Component Interconnect Express (PCIe) controller configured to transition a PCIe link from an L2 Fast link state to a Recovery link state.

Some aspects may further include the PCIe controller configured to transition the PCIe link from an L2/L3 Ready link state to the L2 Fast link state.

Some aspects may further include the PCIe controller configured to transition the PCIe link from an L0 link state to the L2 Fast link state, and transition the PCIe link from the Recovery link state to the to the L0 link state.

In some aspects, transitioning the PCIe link from the L0 link state to the L2 Fast link state may include transitioning the PCIe link from the L0 link state to an L2/L3 Ready link state, and transitioning the PCIe link from the L2/L3 Ready link state to the L2 Fast link state.

Further aspects include a computing device including a memory and a Peripheral Component Interconnect Express (PCIe) controller configured to perform operations of any of the methods summarized above. Further aspects include a non-transitory processor-readable storage medium having stored thereon processor-executable software instructions configured to cause a processor to perform operations of any of the methods summarized above. Further aspects include a computing device having means for accomplishing functions of any of the methods summarized above.

BRIEF DESCRIPTION OF THE DRAWINGS

The accompanying drawings, which are incorporated herein and constitute part of this specification, illustrate example embodiments of various embodiments, and together with the general description given above and the detailed description given below, serve to explain the features of the claims.

DETAILED DESCRIPTION

Figure 1:
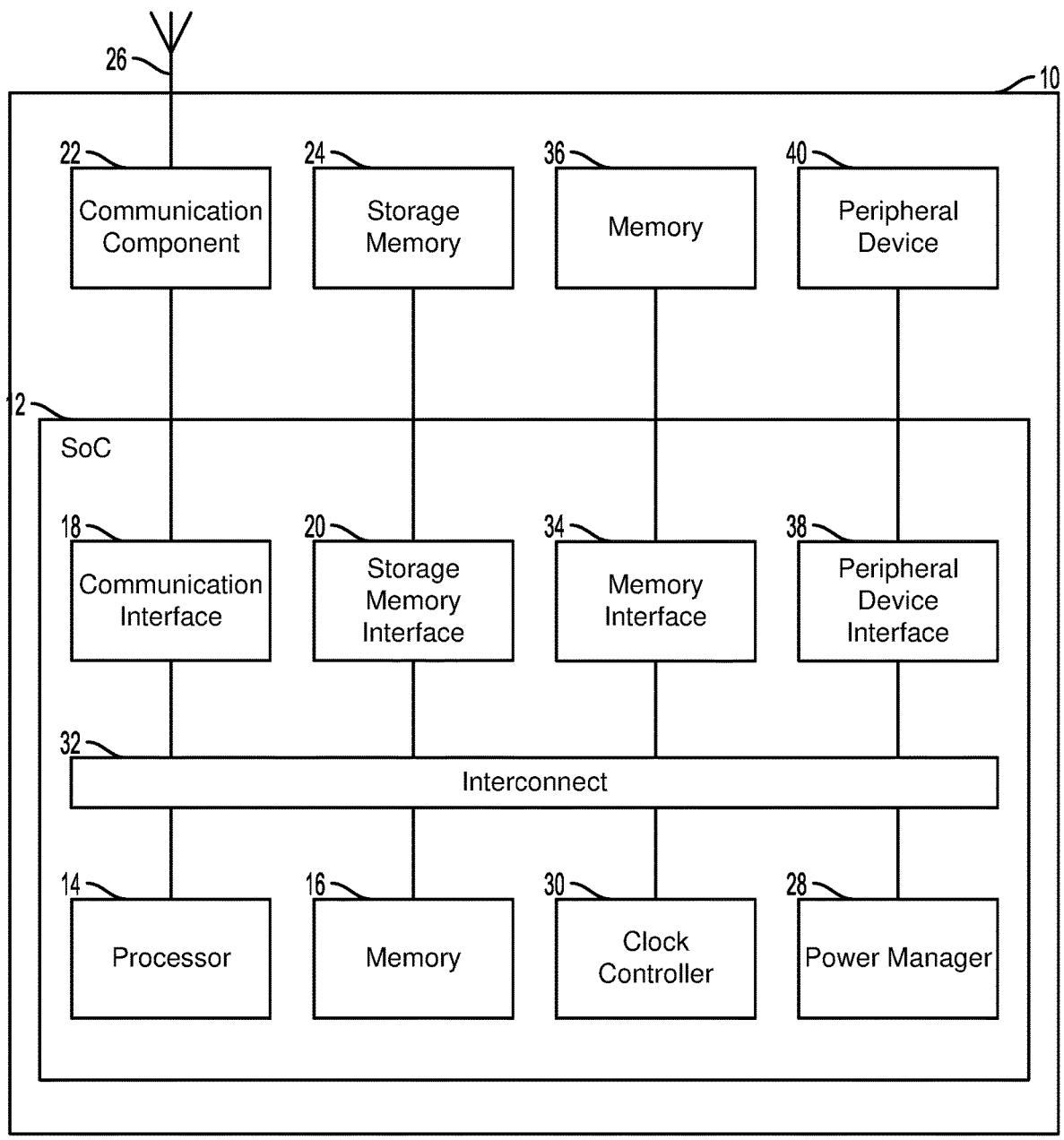
FIG. 1 is a component block diagram illustrating an example computing device suitable for implementing various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods, and computing devices implementing such methods of implementing Peripheral Component Interconnect Express (PCIe) link state transitions. Various embodiments may include maintaining PCIe link configuration data in a memory during a fast recovery low power state of the PCIe link and using the PCIe link configuration data to re-initialize the PCIe link for transitioning from the fast recovery low power state of the PCIe link to an active state of the PCIe link.

The term "computing device" is used herein to refer to stationary computing devices including personal computers, desktop computers, all-in-one computers, workstations, super computers, mainframe computers, embedded computers (such as in vehicles and other larger systems), computerized vehicles (e.g., partially or fully autonomous terrestrial, aerial, and/or aquatic vehicles, such as passenger vehicles, commercial vehicles, recreational vehicles, etc.), servers, multimedia computers, and game consoles. The terms "computing device" and "mobile computing device" are used interchangeably herein to refer to any one or all of cellular telephones, smartphones, personal or mobile multimedia players, personal data assistants (PDA's), laptop computers, tablet computers, convertible laptops/tablets (2-in-1 computers), smartbooks, ultrabooks, netbooks, palm-top computers, wireless electronic mail receivers, multimedia Internet enabled cellular telephones, mobile gaming consoles, wireless gaming controllers, and similar personal electronic devices that include a memory, and a programmable processor.

Various embodiments are described in terms of code, e.g., processor-executable instructions, for ease and clarity of explanation, but may be similarly applicable to any data, e.g., code, program data, or other information stored in memory. The terms "code", "data", and "information" are used interchangeably herein and are not intended to limit the scope of the claims and descriptions to the types of code, data, or information used as examples in describing various embodiments.

Exit latencies from L2 (link suspend state) to L0 (active state) in PCIe specifications incur high costs (in the order of ms) and place pressure on application design to improve system responsiveness. Current designs (e.g., in PCIe REV 6.0 spec) require following a resume path from PCIe L2 to L0 link states to support a wakeup sequence of L2 to Detect to Polling to Configuration to L0 states.

Various embodiments address and overcome the costs of the exit latencies from the L2 state. Some embodiments include a L2 fast recovery state that may enable a resume path to L0 by retaining a last link configuration data in PCIe configuration space followed by entering a Recovery state rather than the Detect to Polling to Configuration path.

In the Recovery state, the transmitter and receiver may send and receive data using the configured PCIe link and lane number as well as the previously supported data rate(s). Recovery enables a configured PCIe link to re-establish bit lock, symbol lock, block alignment, and/or lane-to-lane de-skew operating states.

Various embodiments enable PCIe re-initialization while bypassing the Detect state, and Polling and Configuration state functionalities may be handled by the Recovery state functionalities. The L2 fast recovery to Recovery to L0 path reduces the time to resume operations compared to the conventional L2 to Detect to Polling to Configuration to L0 path. This reduced latency further improves software and hardware performance in terms of Turn Around Time for transfers over the PCIe link L2 fast state as compared to when the PCIe link is in the traditional L2 state.

FIG. 1 illustrates a system including a computing device 10 suitable for use with various embodiments. With reference to FIG. 1, the computing device 10 may include a system-on-chip (SoC) 12 with a processor 14, a memory 16, a communication interface 18, a storage memory interface 20, a memory interface 34, a power manager 28, a clock controller 30, a peripheral device interface 38, and an interconnect 32. The computing device 10 may further include a communication component 22, such as a wired or wireless modem, a storage memory 24, an antenna 26 for establishing a wireless communication link, a memory 36, and a peripheral device 40. The processor 14 may include any of a variety of processing devices, for example a number of processor cores.

The term "system-on-chip" (SoC) is used herein to refer to a set of interconnected electronic circuits typically, but not exclusively, including a processing device, a memory, and a communication interface. A processing device may include a variety of different types of processors 14 and processor cores, such as a general purpose processor, a central processing unit (CPU), a digital signal processor (DSP), a graphics processing unit (GPU), an accelerated processing unit (APU), a secure processing unit (SPU), a subsystem processor of specific components of the computing device, such as an image processor for a camera subsystem or a display processor for a display, an auxiliary processor, a single-core processor, a multicore processor, a controller, and a microcontroller. A processing device may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

An SoC 12 may include one or more processors 14. The computing device 10 may include more than one SoC 12, thereby increasing the number of processors 14 and processor cores. The computing device 10 may also include processors 14 that are not associated with an SoC 12. The processors 14 may each be configured for specific purposes that may be the same as or different from other processors 14 of the computing device 10. One or more of the processors 14 and processor cores of the same or different configurations may be grouped together. A group of processors 14 or processor cores may be referred to as a multi-processor cluster.

The memory 16, 36 of the SoC 12 may be a volatile or non-volatile memory configured for storing data and processor-executable code for access by the processor 14. The computing device 10 and/or SoC 12 may include one or more memories 16, 36 configured for various purposes. One or more memories 16, 36 may include volatile memories such as random access memory (RAM) or main memory, including static RAM (SRAM) and/or dynamic RAM (DRAM), or cache memory. These memories 16, 36 may be configured to temporarily hold a limited amount of data received from a data sensor or subsystem, data and/or processor-executable code instructions that are requested from a non-volatile memory 16, 24, loaded to the memories 16 from the non-volatile memory 16, 24 in anticipation of future access based on a variety of factors, and/or intermediary processing data and/or processor-executable code instructions produced by the processor 14 and temporarily stored for future quick access without being stored in non-volatile memory 16, 24. The memory interface 34 and the memory 36 may work in unison to allow the computing device 10 to load and retrieve data and processor-executable code on the memory 36.

The storage memory interface 20 and the storage memory 24 may work in unison to allow the computing device 10 to store data and processor-executable code on a non-volatile storage medium. The storage memory 24 may be configured much like an embodiment of the memory 16 in which the storage memory 24 may store the data or processor-executable code for access by one or more of the processors 14. The storage memory 24, being non-volatile, may retain the information after the power of the computing device 10 has been shut off. When the power is turned back on and the computing device 10 reboots, the information stored on the storage memory 24 may be available to the computing device 10. The storage memory interface 20 may control access to the storage memory 24 and allow the processor 14 to read data from and write data to the storage memory 24.

The power manager 28 may be configured to control power states of and/or power delivery to the components of the SoC 12. In some embodiments, the power manager 28 may be configured to signal power states to the components of the SoC 12 to prompt the components of the SoC 12 to transition to the signaled power states. In some embodiments, the power manager 28 may be configured to control amounts of power provided to the components of the SoC 12. For example, the power manager 28 may be configured to control connections between components of the SoC 12 and power rails (not shown). As another example, the power manager 28 may be configured to control amounts of power on power rails connected to the components of the SoC 12.

A clock controller 30 may be configured to control clock signals transmitted to the components of the SoC 12. In some embodiments, the clock controller 30 may be configured to signal clock states, such as gated or ungated, to components of the SoC 12 to prompt the components of the SoC 12 to transition to the clock state. For example, a component of the SoC 12 may transition to a gated clock state in response to receiving a gated clock state signal from the clock controller 30 by disconnecting from a clock signal and may transition to an ungated clock state in response to receiving an ungated clock state signal from the clock controller 30 by connecting to the clock signal. In some embodiments, the clock controller 30 may be configured to control clock signals to components of the SoC 12. For example, the clock controller 30 may disconnect a component of the SoC 12 from a clock signal to transition the component of the SoC 12 to a gated clock state and may connect the component of the SoC 12 to the clock signal to transition the component of the SoC 12 to an ungated clock state.

A peripheral device interface 38 may enable components of the SoC 12, such as the processor 14 and/or the memory, to communicate with a peripheral device 40. The peripheral device interface 38 may provide and mange physical and logical connections between the components of the SoC 12 and the peripheral device 40. The peripheral device interface 38 may also manage communication between the components of the SoC 12 and the peripheral device 40, such as by directing and/or allowing communications between transmitter and receiver pairs of the components of the SoC 12 and the peripheral device 40 for a communication. The communications may include transmission of memory access commands, addresses, data, interrupt signals, state signals, etc. A peripheral device 40 may be any component of the computing device 10 separate from the SoC 12, such as a processor, a memory, a subsystem, etc. In some embodiments, the peripheral device interface 38 may enable PCIe protocol communication between the components of the SoC 12 and the peripheral device 40

The interconnect 32 may be a communication fabric, such as a communication bus, configured to communicatively connect the components of the SoC 12. The interconnect 32 may transmit signals between the components of the SoC 12. In some embodiments, the interconnect 32 may be configured to control signals between the components of the SoC 12 by controlling timing and/or transmission paths of the signals.

Figure 2:
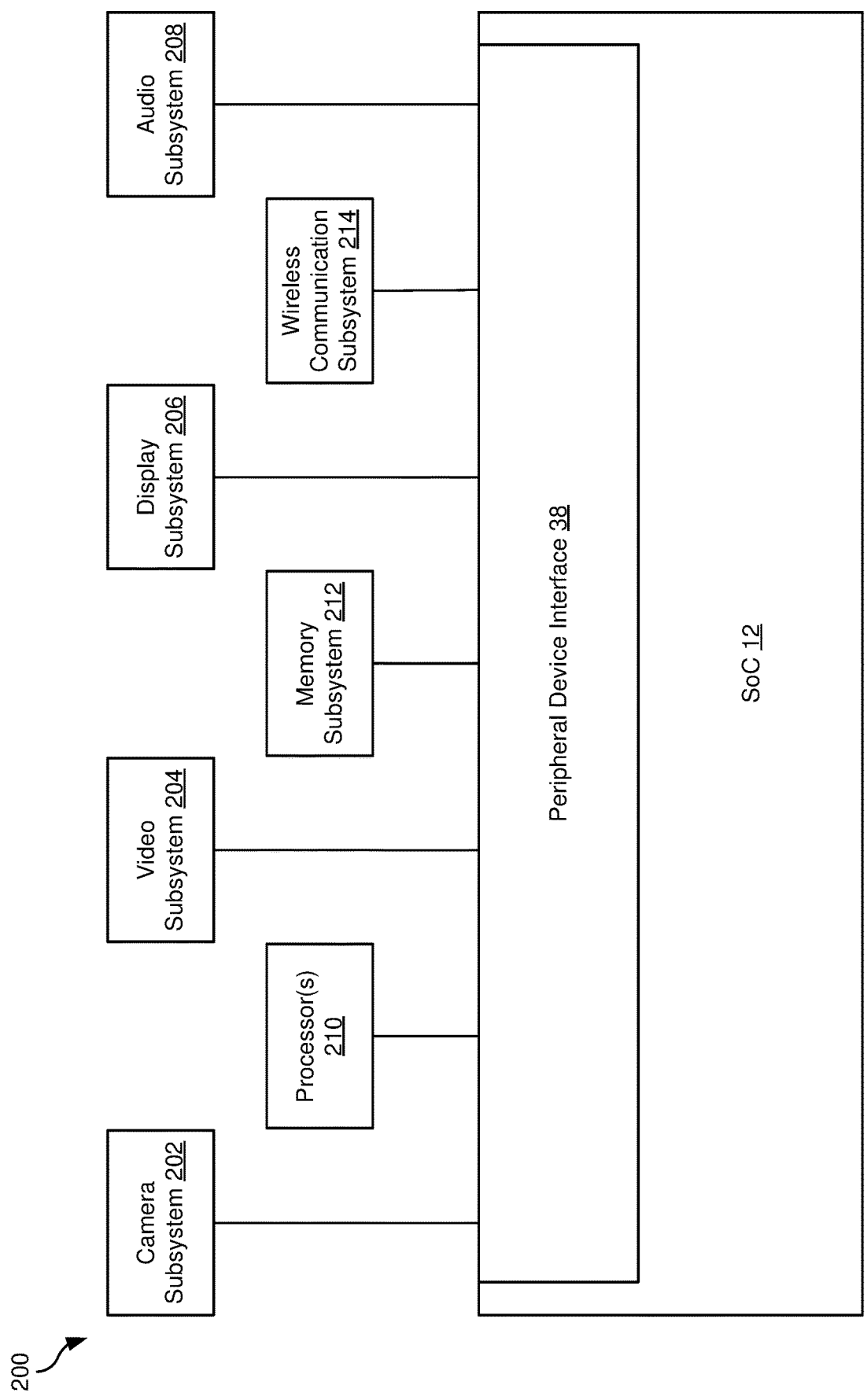
FIG. 2 is a component block diagram illustrating an example peripheral device system suitable for implementing various embodiments.

Some or all of the components of the computing device 10 and/or the SoC 12 may be arranged differently and/or combined while still serving the functions of the various embodiments. The computing device 10 may not be limited to one of each of the components, and multiple instances of each component may be included in various configurations of the computing device FIG. 2 illustrates an example peripheral device system 200 suitable for implementing various embodiments. With reference to FIGS. 1 and 2, the peripheral device system 200 may include any number and combination of peripheral devices 202, 204, 206, 208, 210, 212, 214 (e.g., peripheral device 40) communicatively connected to one or more peripheral device interfaces 38 of an SoC 12.

A peripheral device interface 38 may communicatively connect one or more peripheral devices 202, 204, 206, 208, 210, 212, 214 with one or more components of the SoC 12 as described, including a processor (e.g., processor 14) and/or a memory (e.g., memory 16). The processor may include any number and combination of CPUs, GPUs, DSPs, APUs, SPUs etc. The memory may include any number and combination of system caches, random access memories (RAM), registers, FLASH, EPROM, etc. Communicatively connecting a peripheral device 202, 204, 206, 208, 210, 212, 214 with a component of the SoC 12 via the peripheral device interface 38 may enable transmission of communications between the peripheral device 202, 204, 206, 208, 210, 212, 214 and the component of the SoC 12. Such communications may include memory access commands, addresses, data, interrupt signals, state signals, etc.

In some embodiments, the peripheral device may include one or more processors 210 (e.g., processor 14), such as a processor or processor cluster separate from the SoC 12. For example, a processor 210 may include any number and combination of CPUs, GPUs, DSPs, APUs, SPUs etc. In some embodiments, the peripheral device may include various peripheral device subsystems (e.g., communication component 22, storage memory 24, memory 36, peripheral device 40) having one or more processors (e.g., processor 14) and memories (e.g., memory 16, 24, 36), such as camera, video, display, audio, memory, and wireless communication subsystems 202, 204, 206, 208, 212, 214. A processor may include any number and combination of CPUs, GPUs, DSPs, APUs, SPUs etc. A memory may include any number and combination of caches, RAM, registers, FLASH, EPROM, etc. In some embodiments, the peripheral device 202, 204, 206, 208, 210, 212, 214 may include any number and combination of sensors, receivers, transmitters, controllers, and dedicated memories, such as caches and memory registers, configured for controlling and implementing functionalities of the peripheral device 202, 204, 206, 208, 210, 212, 214.

The descriptions of the peripheral devices 202, 204, 206, 208, 210, 212, 214 illustrated in FIG. 2 are only meant to be examples and in no way limiting. Several of the components of the illustrated example peripheral devices 202, 204, 206, 208, 210, 212, 214 may be variably configured, combined, and separated. Several of the peripheral devices 202, 204, 206, 208, 210, 212, 214 may be included in greater or fewer numbers and may be located and connected differently than illustrated.

Figure 3:
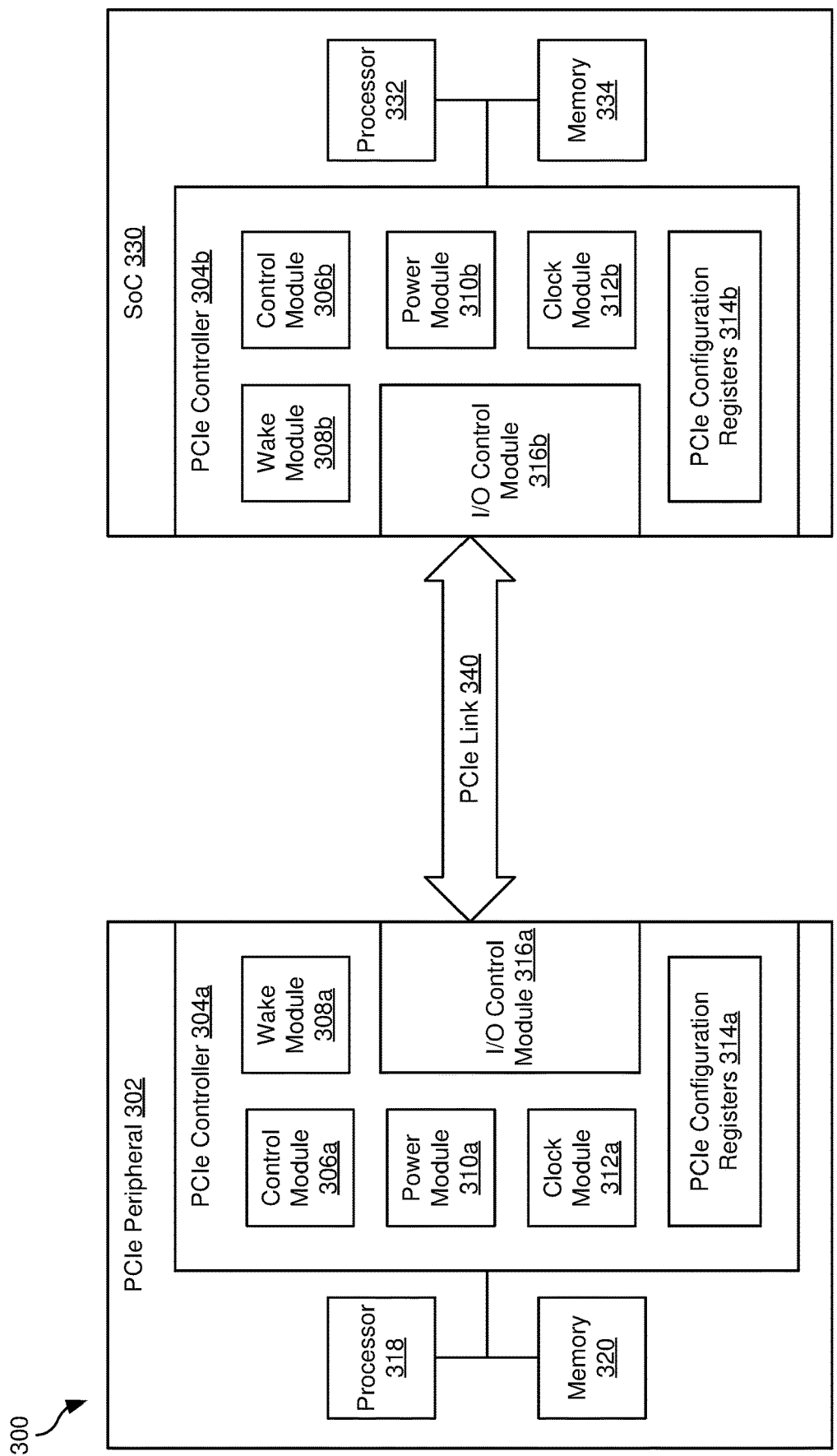
FIG. 3 is a component block diagram illustrating an example Peripheral Component Interconnect Express (PCIe) system suitable for implementing various embodiments.

FIG. 3 illustrates an example Peripheral Component Interconnect Express (PCIe) system 300 suitable for implementing various embodiments. With reference to FIGS. 1-3 the PCIe system 300 may include at least a pair of PCIe enabled devices 302, 330 of a computing device (e.g., computing device 10) configured to communicate with each other via PCIe protocol. A pair of PCIe enabled devices 302, 330 may include, for example, a PCIe peripheral 302 (e.g., peripheral device 40, 202, 204, 206, 208, 210, 212, 214) and an SoC 330 (e.g., SoC 12). The PCIe peripheral 302 may be any peripheral device of the computing device configured to communicate with another component of the computing device via PCIe protocol.

The pair of PCIe enabled devices 302, 330 may include any combination of hardware, software, firmware, etc. configured for enabling communication between the pair of PCIe enabled devices 302, 330 via PCIe protocol. For example, each pair of PCIe enabled devices 302, 330 may include a PCIe controller 304a, 304b (e.g., peripheral device interface 38 in FIGS. 1 and 2) configured to enable communication via PCIe protocol. In some embodiments, each PCIe enabled device 302, 330 may include a processor 318, 332 (e.g., processor 14, 210) and a memory 320, 334 (e.g., memory 16, 24, 36, and/or memory subsystem 212). In some embodiments, the PCIe controller 304a, 304b may be communicatively connected to the processor 318, 332 and/or the memory 320, 334 of the PCIe enabled device 302, 330 with which the PCIe controller 304a, 304b is associated.

A PCIe controller 304a, 304b may include a control module 306a, 306b, a wake module 308a, 308b, an input/output (I/O) control module 316a, 316b, and PCIe configuration registers 314a, 314b. In some embodiments, the PCIe controller 304a, 304b may also include a power module 310a, 310b and/or a clock module 321a, 312b. A control module 306a, 306b may be configured to control various functions of the PCIe controller 304a, 304b. Such functions may include, enumeration of the PCIe enabled devices 302, 330 in the PCIe system 300, communication functions for communicating between PCIe enabled devices 302, 330 and between the PCIe enabled devices 302, 330 and the processor 318, 332 and/or the memory 320, 334 of the PCIe enabled device 302, 330 with which the PCIe controller 304a, 304b is associated, etc.

An I/O control module 316a, 316b may be configured to generate, transmit, and/or receive PCIe communications and signals via a PCIe link 340 established between the pair of PCIe enabled devices 302, 330. The communications and signals may include memory access commands, addresses, data, interrupt signals, state signals, etc. generated, transmitted, and/or received by the I/O control module 316a, 316b. For example, the I/O control module 316a, 316b may generate, transmit, and/or receive instructions via the communications and/or signals to transition between link states. For example, an instruction may be for the PCIe controller 304a, 304b to transition from a link active state (e.g., L0 link state) to a lower power link state, such as a link suspend/sleep state (e.g., L2 link state) or a fast recovery link suspend/sleep state (e.g., L2 fast link state).

Similarly, an instruction may be for the PCIe controller 304a, 304b to transition from the link suspend/sleep state (e.g., L2 link state) or the fast recovery link suspend/sleep state (e.g., L2 fast link state) to a higher power link state, such as the link active state (e.g., L0 link state). For example, the instruction for the PCIe controller 304a, 304b to transition from the link suspend/sleep state (e.g., L2 link state) or the fast recovery link suspend/sleep state (e.g., L2 fast link state) to the higher power link state may be a Beacon signal (using in-band signaling) and/or a WAKE #signal (using sideband signaling). A signal associated with the instruction for the PCIe controller 304a, 304b to transition from the link suspend/sleep state (e.g., L2 link state) or the fast recovery link suspend/sleep state (e.g., L2 fast link state) to the higher power link state may include a "power good" signal configured to indicate a stable voltage for the main power source to the PCIe controller 304a, 304b which may be sent in response to receiving the wake signal. Said another way, the power good signal may indicate that a stable voltage of electric power is to be provided to the PCIe controller 304a, 304b.

A clock module 312a, 312b may provide clock signals to the PCIe controller 304a, 304b to control timing of execution of functions of the PCIe controller 304a, 304b. In some embodiments, the clock module 312a, 312b may provide clock signals to the control module 306a, 306b, the wake module 308a, 308b, and/or the I/O control module 316a, 316b. For example, during or during transition to and/or from the link active state (e.g., L0 link state), the clock module 312a, 312b may provide clock signals to the control module 306a, 306b, the wake module 308a, 308b, and/or the I/O control module 316a, 316b. For another, example, during the link suspend/sleep state (e.g., L2 link state) or the fast recovery link suspend/sleep state (e.g., L2 fast link state), the clock module 312a, 312b may not provide, or gate, clock signals to the control module 306a, 306b, the wake module 308a, 308b, and/or the I/O control module 316a, 316b.

In some embodiments, the clock module 312a, 312b may be integral to the PCIe controller 304a, 304b. In some embodiments, the clock module 312a, 312b may be separate from the PCIe controller 304a, 304b, such as integral to the PCIe enabled device 302, 330 with which the PCIe controller 304a, 304b is associated.

A power module 310a, 310b may be configured to provide and/or regulate electric power to the PCIe controller 304a, 304b to control ability to execute functions of the PCIe controller 304a, 304b. In some embodiments, the power module 310a, 310b may provide and/or regulate electric power to the control module 306a, 306b, the wake module 308a, 308b, the I/O control module 316a, 316b, and/or the PCIe configuration registers 314a, 314b. For example, during the link active state (e.g., L0 link state) or during transition to and/or from the link active state (e.g., L0 link state), the power module 310a, 310b may provide and/or regulate electric power to the control module 306a, 306b, the wake module 308a, 308b, the I/O control module 316a, 316b, and/or the PCIe configuration registers 314a, 314b. For another, example, during the link suspend/sleep state (e.g., L2 fast link state), the power module 310a, 310b may not provide and/or regulate electric power to the control module 306a, 306b, the I/O control module 316a, 316b, and the PCIe configuration registers 314a, 314b, and may provide and/or regulate electric power to the wake module 308a, 308b. For another, example, during or the fast recovery link suspend/sleep state (e.g., L2 fast link state), the power module 310a, 310b may not provide and/or regulate electric power to the control module 306a, 306b and the I/O control module 316a, 316b, and may provide and/or regulate electric power to the wake module 308a, 308b and/or the PCIe configuration registers 314a, 314b.

In some embodiments, the power module 310a, 310b may be integral to the PCIe controller 304a, 304b. In some embodiments, the power module 310a, 310b may be separate from the PCIe controller 304a, 304b, such as integral to the PCIe enabled device 302, 330 with which the PCIe controller 304a, 304b is associated.

In some embodiments, the power module 310a, 310b may provide and/or regulate electric power to the PCIe controller 304a, 304b by selectively electrically connecting different electric power sources, such as a main power source and an auxiliary power source (not shown). The main power source may be greater voltage than the auxiliary power. For example, during or during transition to and/or from the link active state (e.g., L0 link state), the power module 310a, 310b may provide and/or regulate electric power to the PCIe controller 304a, 304b from the main power source. As another example, during the fast recovery link suspend/sleep state (e.g., L2 fast link state), the power module 310a, 310b may provide and/or regulate electric power to the wake module 308a, 308b and/or the PCIe configuration registers 314a, 314b from the auxiliary power.

PCIe configuration registers 314a, 314b may be configured to store data relating to the configuration of the PCIe link 340. For example, the PCIe configuration registers 314a, 314b may store data detailing the configuration of the PCIe link 340. As another example, the example, the PCIe configuration registers 314a, 314b may store references to locations in the memory 320, 334 at which data detailing the configuration of the PCIe link 340 may be stored.

The PCIe configuration registers 314a, 314b may be populated during initialization of the PCIe link 340. For example, the PCIe controller 304a, 304b may write to the PCIe configuration registers 314a, 314b to populate the PCIe configuration registers 314a, 314b. During and/or while transitioning between the link active state (e.g., L0 link state) and/or the fast recovery link suspend/sleep state (e.g., L2 fast link state), the power module 310a, 310b providing and/or regulating the main power source and/or an auxiliary power source to the PCIe configuration registers 314a, 314b may enable the PCIe configuration registers 314a, 314b to maintain the data detailing the configuration of the PCIe link 340. During the link suspend/sleep state (e.g., L2 link state), the power module 310a, 310b not providing and/or regulating the main power source and/or an auxiliary power source to the PCIe configuration registers 314a, 314b may cause the PCIe configuration registers 314a, 314b to lose the data detailing the configuration of the PCIe link 340.

In some embodiments, the PCIe configuration registers 314a, 314b may include data relating to whether a fast recovery link suspend/sleep state (e.g., L2 fast link state) is enabled. The PCIe controller 304a, 304b may implement the fast recovery link suspend/sleep state (e.g., L2 fast link state) in response to an instruction to transition from the link active state (e.g., L0 link state) or a link standby state (e.g., L1 link state) to a lower power link state based on the data at the PCIe configuration registers 314a, 314b indicating that the fast recovery link suspend/sleep state (e.g., L2 fast link state) is enabled.

A wake module 308a, 308b may be configured to transition the PCIe controller 304a, 304b from the link suspend/sleep state (e.g., L2 link state) and/or the fast recovery link suspend/sleep state (e.g., L2 fast link state) to a higher power link state, such as the link active state (e.g., L0 link state). For example, the wake module 308a, 308b may initiate transition from the fast recovery link suspend/sleep state (e.g., L2 fast link state) in response to the PCIe controller 304a, 304b receiving an instruction for the transition and a power good signal to indicate a stable voltage for the main power source to the PCIe controller 304a, 304b. The wake module 308a, 308b may trigger the power module 310a, 310b to provide and/or regulate main power from a main power source to the PCIe controller 304a, 304b, and trigger the clock module 312a, 312b to provide clock signals to the PCIe controller 304a, 304b. The control module 306a, 306b and/or the I/O control module 316a, 316b may then retrieve the data detailing the configuration of the PCIe link 340 from the PCIe configuration registers 314a, 314b and/or from the locations in the memory 320, 334 using the references to the memory stored at the PCIe configuration registers 314a, 314b. The control module 306a, 306b and/or the I/O control module 316a, 316b may implement functions of the PCIe controller 304a, 304b using the PCIe link 340 based on the retrieved data detailing the configuration of the PCIe link 340.

Figure 4:
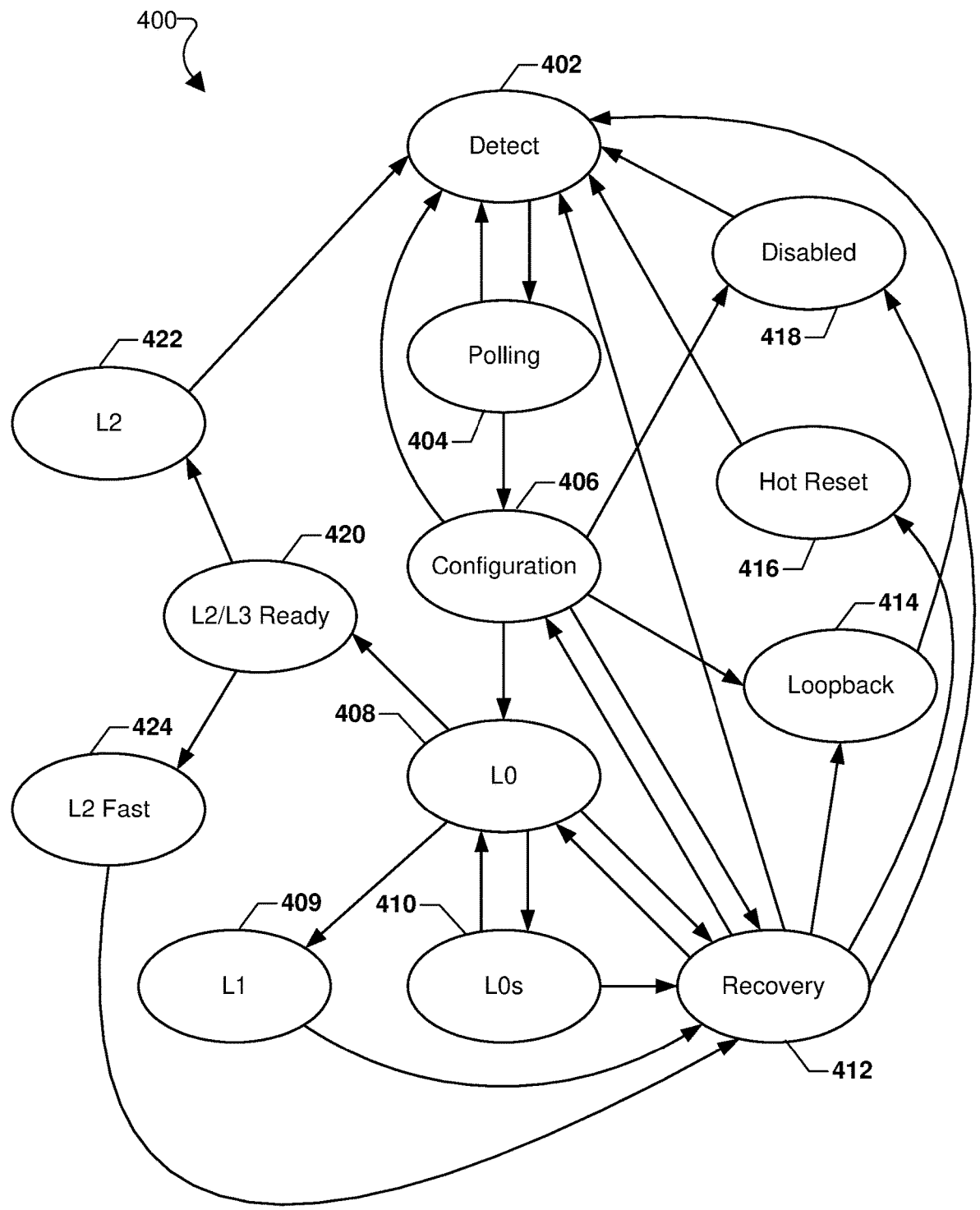
FIG. 4 is a graph flow diagram illustrating an example link training status and state machine according to an embodiment.

FIG. 4 illustrates an example link training status and state machine (LTSSM) 400 according to an embodiment. With reference to FIGS. 1-4, the LTSSM 400 may be implemented by the PCIe controller (e.g., the PCIe controller 304a, 304b). For example, the LTSSM 400 may be implemented in a physical layer (e.g., control module 306a, 306b and/or the I/O control module 316a, 316b in FIG. 3) of the PCIe controller. The various states of the LTSSM 400, including: Detect 402; Polling 404; Configuration 406; L0 408, L1 409; L0s 410; Recovery 412; Loopback 414; Hot Reset 416; Disabled 418; L2/L3 Ready 420; and L2 422 may be implemented as known for the PCIe protocol. Some states of the LTSSM 400, including L2 Fast 424 may be implemented as described further herein, and including L2/L3 Ready 420 and Recovery 412 may be further implemented in a modified manner as described further herein.

The link states, including L0 408, L1 409; L0s 410; L2/L3 Ready 420; L2 422, and L2 Fast 424 may include different configurations, some of which are outlined in the Table 1 below:

Implementing the Recovery 412 state functions, enables the PCIe controller to send and receive data using the re-initialized PCIe link, including, for example, a lane number and/or previously supported data rate(s). The

TABLE 1

| Link State | Description | Used By Software Directed Power Management | Used By Active-state Power Management | Platform Ref. Clocks | Platform Main Power | Component Internal Phase-locked Loop | Auxiliary Power |
|---|---|---|---|---|---|---|---|
| L0 | Fully active | Yes | Yes | On | On | On | On/Off |
| L0s | Standby | No | Yes | On | On | On | On/Off |
| L1 | Lower power standby | Yes | Yes | On/Off | On | On/Off | On/Off |
| L2/L3 Ready | Staging point for power removal | Yes | No | On/Off | On | On/Off | On/Off |
| L2 | Low power sleep (all clocks, main power off) | Yes | No | Off | Off | Off | On |
| L3 | Off (zero power) | n/a | n/a | Off | Off | Off | Off |

At L2/L3 Ready 420, the LTSSM 400 may be implemented to transition to L2 422 or L2 Fast 424. For example, the LTSSM 400 may be implemented to transition to L2 422 in response to the PCIe controller determining that L2 Fast 424 is not enabled and/or L2 422 is enabled for a PCIe enabled device (e.g., SoC 12, peripheral device 40, 202, 204, 206, 208, 210, 212, 214, PCIe enabled device 302, 330). The LTSSM 400 may be implemented to transition to L2 Fast 424 in response to the PCIe controller determining that L2 Fast 424 is enabled and/or L2 422 is not enabled for the PCIe enabled device. In the L2 Fast 424 state, the PCIe controller may provide auxiliary power to PCIe configuration registers (e.g., PCIe configuration registers 314a, 314b in FIG. 3) to maintain the data detailing configuration of a PCIe link (e.g., PCIe link 340) for the PCIe enabled device.

Transitioning out of the L2 422 state to the L0 408 state, the LTSSM 400 may be implemented to transition to Detect 402, then Poling 404, then Configuration 406, then L0 408. The path from the L2 422 state to the L0 408 state initializes a PCIe link for use in the L0 408 state.

Transitioning out of the L2 Fast 424 state to the L0 408 state, the LTSSM 400 may be implemented to transition to Recovery 412 then L0 408. The path from the L2 Fast 424 state to the L0 408 state uses the stored data detailing configuration of a PCIe link to re-initialize a previous PCIe link for use in the L0 408 state.

Re-initializing the previous PCIe link for transitioning from the L2 Fast 424 state to the L0 408 state implements fewer state functions incurs a lesser latency cost than initializing the PCIe link for transitioning from the L2 422 state to the L0 408 state. The process for transitioning from the L2 Fast 424 state to the L0 408 state incurs a lesser latency cost than transitioning from the L2 422 state to the L0 408 state by using the stored data detailing configuration of a PCIe link rather than having to discover the data detailing configuration of a PCIe link.

Recovery 412 state functions enable the re-initialized PCIe link to change the data rate of operation, re-establish bit lock, symbol lock, block alignment, and/or lane-to-lane de-skew.

Figure 5A:
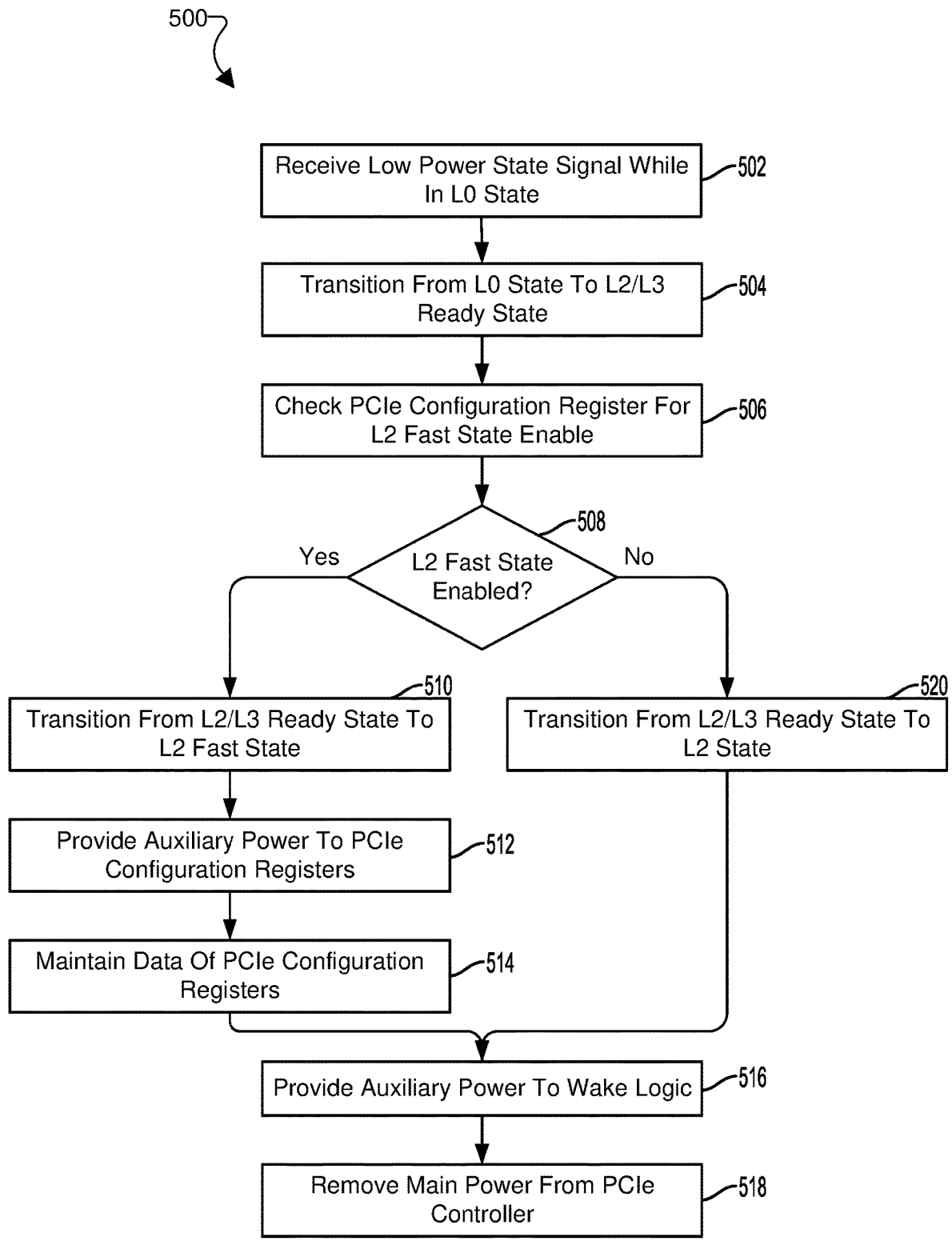
FIG. 5A is a process flow diagram illustrating a method for implementing reduced latency PCIe L2 link state transition according to an embodiment.

FIG. 5A illustrates a method 500 for implementing reduced latency PCIe L2 link state transition according to an embodiment. With reference to FIGS. 1-5A, the method 500 may be implemented in a computing device (e.g., computing device 10, SoC 12, peripheral device 40, 202, 204, 206, 208, 210, 212, 214, PCIe enabled device 302, 330), in hardware (e.g., peripheral device interface 38, PCIe controller 304a, 304b, control module 306a, 306b, wake module 308a, 308b, power module 310a, 310b, clock module 312a, 312b, I/O control module 316a, 316b, LTSSM 400), in software (e.g., control module 306a, 306b, wake module 308a, 308b, power module 310a, 310b, clock module 312a, 312b, I/O control module 316a, 316b, LTSSM 400) executing in a processor (e.g., processor 14, 210, PCIe controller 304a, 304b), or in a combination of a software-configured processor and dedicated hardware that includes other individual components, such as various memories/caches (e.g., memory 16, 24, 36, memory subsystem 212, PCIe configuration registers 314a, 314b, memory 320, 334) and various memory/cache controllers. In order to encompass the alternative configurations enabled in various embodiments, the hardware implementing the method 500 is referred to herein as a "PCIe control device."

In block 502, the PCIe control device may receive a low power state signal while in a link active state (e.g., L0 link state). The low power state signal may trigger the PCIe control device to transition a PCIe controller (e.g., PCIe controller 304a, 304b) associated with the PCIe control device to a lower power state than the link active state (e.g., L0 link state). The lower power state may be a link suspend/sleep state (e.g., L2 fast link state) or a fast recovery link suspend/sleep state (e.g., L2 fast link state). The low power state signal may be received from another PCIe controller. In some embodiments, the PCIe control device receiving the low power state signal while in the link active state (e.g., L0 link state) in block 502 may be, for example, the PCIe controller, a control module (e.g., control module 306a, 306b), and/or an I/O control module (e.g., I/O control module 316a, 316b). Means for performing the operations in block 502 may include the PCIe controller, a control module (e.g., control module 306a, 306b), and/or an I/O control module (e.g., I/O control module 316a, 316b).

In block 504, the PCIe control device may transition from the link active state (e.g., L0 link state) to a link transition state (e.g., L2/L3 ready link state). The PCIe control device may implement the transition between link states via known means. In some embodiments, the PCIe control device transitioning from the link active state (e.g., L0 link state) to the link transition state (e.g., L2/L3 ready link state) in block 504 may be, for example, the PCIe controller, the control module, and/or the I/O control module. Means for performing the operations in block 504 may include the PCIe controller, the control module, and/or the I/O control module.

In block 506, the PCIe control device may check a PCIe configuration register (e.g., PCIe configuration registers 314a, 314b) for a fast recovery link suspend/sleep state (e.g., L2 fast link state) enable value. The PCIe configuration register may contain a value configured to indicate to the PCIe control device whether fast recovery link suspend/sleep state (e.g., L2 fast link state) is enabled for the PCIe controller associated with the PCIe control device. The PCIe control device may read the value at the PCIe configuration register. In some embodiments, the PCIe control device checking the PCIe configuration register for the fast recovery link suspend/sleep state (e.g., L2 fast link state) enable value in block 506 may be, for example, the PCIe controller, the control module, and/or the I/O control module. Means for performing the operations in block 506 may include the PCIe controller, the control module, and/or the I/O control module.

In determination block 508, the PCIe control device may determine whether fast recovery link suspend/sleep state (e.g., L2 fast link state) is enabled. The PCIe control device may interpret the value read from the PCIe configuration register to determine whether fast recovery link suspend/sleep state (e.g., L2 fast link state) is enabled. For example, the value may be a bit for which one value (e.g., 1) may indicate enabled and a different value (e.g., 0) may indicate disabled. In some embodiments, the PCIe control device determining whether fast recovery link suspend/sleep state (e.g., L2 fast link state) is enabled in determination block 508 may be, for example, the PCIe controller, the control module, and/or the I/O control module. Means for performing the operations in block 508 may include the PCIe controller, the control module, and/or the I/O control module.

In response to determining that fast recovery link suspend/sleep state (e.g., L2 fast link state) is enabled (i.e., determination block 508="Yes"), the PCIe control device may transition from the link transition state (e.g., L2/L3 ready link state) to the fast recovery link suspend/sleep state (e.g., L2 fast link state) in block 510. Transitioning between the states may include signaling to components of the PCIe controller associated with the PCIe control device of the state change. The components may include the control module, the I/O control module, a wake module (e.g., wake module 308a, 308b), a clock module (e.g., clock module 312a, 312b), and/or a power module (e.g., power module 310a, 310b). The signals may prompt the components to prepare for the state change. For example, the components may store state information while the components may be power collapsed to be used to bring the components back up. In some embodiments, the PCIe control device transitioning from the link transition state (e.g., L2/L3 ready link state) to the fast recovery link suspend/sleep state (e.g., L2 fast link state) in block 510 may be, for example, the PCIe controller, the control module, the I/O control module, the clock module, and/or the power module. Means for performing the operations in block 510 may include the PCIe controller, the control module, the I/O control module, the clock module, and/or the power module.

In block 512, the PCIe control device may provide auxiliary power to the PCIe configuration registers. Data detailing configuration of a PCIe link (e.g., PCIe link 340) for the PCIe control device may be stored at the PCIe configuration registers or at memory locations referenced by the PCIe configuration registers. The PCIe control device may control and/or signal to the power module to provide auxiliary power to the PCIe configuration registers. In some embodiments, the PCIe control device providing auxiliary power to the PCIe configuration registers in block 512 may be, for example, the PCIe controller, the control module, the I/O control module, and/or the power module. Means for performing the operations in block 512 may include the PCIe controller, the control module, the I/O control module, and/or the power module.

In block 514, the PCIe control device may maintain the data stored at the PCIe configuration registers during the fast recovery link suspend/sleep state (e.g., L2 fast link state). Providing auxiliary power to the PCIe configuration registers may maintain the data stored at the PCIe configuration registers. In some embodiments, the PCIe control device may implement other functions, such as a refresh, to maintain the data stored at the PCIe configuration registers. In some embodiments, the PCIe control device maintaining the data stored at the PCIe configuration registers during the fast recovery link suspend/sleep state (e.g., L2 fast link state) in block 514 may be, for example, the PCIe controller, the control module, the I/O control module, and/or the power module. Means for performing the operations in block 514 may include the PCIe controller, the control module, the I/O control module, and/or the power module.

In block 516, the PCIe control device may provide auxiliary power to the wake module. The wake module may be configured for transitioning the PCIe control device from the fast recovery link suspend/sleep state (e.g., L2 fast link state) to the link active state (e.g., L0 link state). The PCIe control device may control and/or signal to the power module to provide auxiliary power to the wake module. The PCIe control device may similarly control and/or signal to the clock module to provide clock signals to the wake module. The auxiliary power and/or clock signals may enable to the wake module to implement functions for transitioning the PCIe control device from the fast recovery link suspend/sleep state (e.g., L2 fast link state) to the link active state (e.g., L0 link state) as described further herein. In some embodiments, the PCIe control device providing auxiliary power and/or clock signals to the wake module in block 516 may be, for example, the PCIe controller, the control module, the I/O control module, the power module, and/or the clock module. Means for performing the operations in block 512 may include the PCIe controller, the control module, the I/O control module, the power module and/or the clock module.

In block 518, the PCIe control device may remove the main power source from the PCIe controller associated with the PCIe control device. Removing main power source may include not providing and/or regulating the main power source to at least portions of the PCIe controller associated with the PCIe control device. For example, the PCIe control device may control and/or signal to the power module to stop providing and/or regulating main power from the main power source to the control module, the I/O control module, the wake module, and/or the PCIe configuration registers. The PCIe control device may similarly control and/or signal to the clock module to not provide, or gate, clock signals to the control module, the wake module, and/or the I/O control module. In some embodiments, the PCIe control device removing main power and/or clock signals from the PCIe controller associated with the PCIe control device in block 518 may be, for example, the PCIe controller, the control module, the I/O control module, the clock module, and/or the power module. Means for performing the operations in block 518 may include the PCIe controller, the control module, the I/O control module, the clock module, and/or the power module.

In response to determining that fast recovery link suspend/sleep state (e.g., L2 fast link state) is not enabled (i.e., determination block 508="No"), the PCIe control device may transition from the link transition state (e.g., L2/L3 ready link state) to the link suspend/sleep state (e.g., L2 link state) in block 520. Transitioning between the states may include signaling to components of the PCIe controller associated with the PCIe control device of the state change. The components may include the control module, the I/O control module, the wake module, the clock module, and/or the power module. The signals may prompt the components to prepare for the state change. For example, the components may store state information while the components may be power collapsed to be used to bring the components back up. In some embodiments, the PCIe control device transitioning from the link transition state (e.g., L2/L3 ready link state) to the link suspend/sleep state (e.g., L2 link state) in block 520 may be, for example, the PCIe controller, the control module, the I/O control module, the clock module, and/or the power module. Means for performing the operations in block 520 may include the PCIe controller, the control module, the I/O control module, the clock module, and/or the power module.

The PCIe control device may provide auxiliary power to the wake module, in block 516, and remove main power from the PCIe controller associated with the PCIe control device in block 518, as described.

Figure 5B:
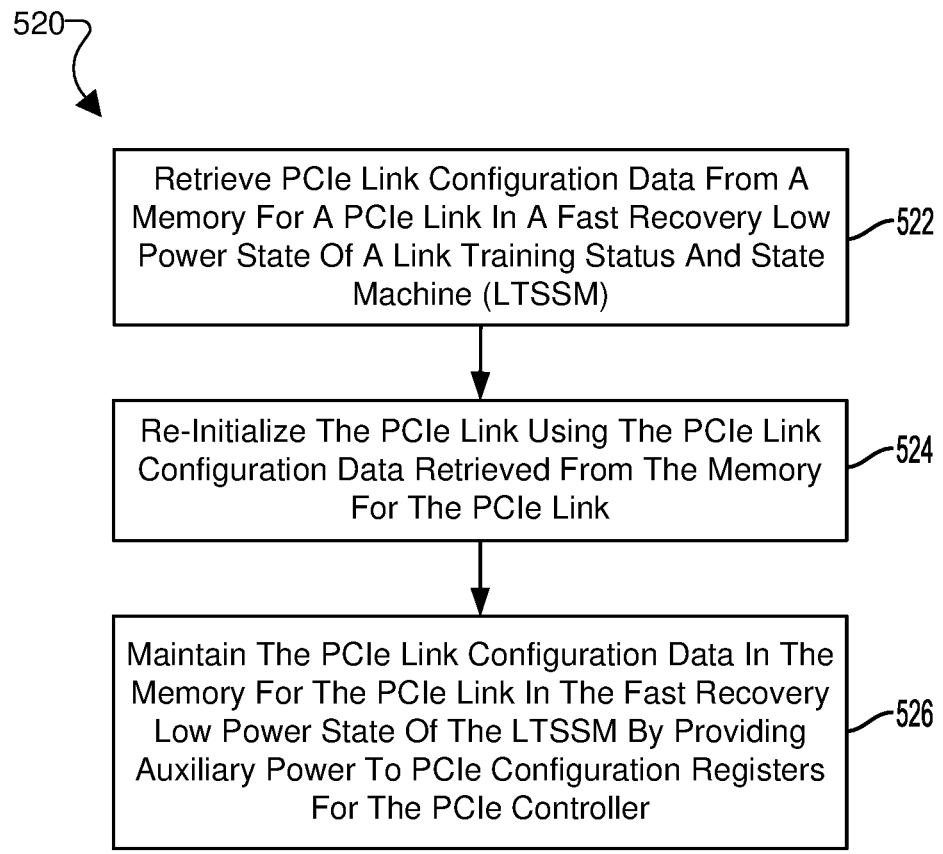
FIG. 5B is a process flow diagram illustrating further operations for implementing reduced latency PCIe L2 link state transition according to an embodiment.

FIG. 5B illustrates a method 520 including further operations for implementing reduced latency PCIe L2 link state transition according to an embodiment. With reference to FIGS. 1-5B, the method 520 may be implemented in a computing device (e.g., computing device 10, SoC 12, peripheral device 40, 202, 204, 206, 208, 210, 212, 214, PCIe enabled device 302, 330), in hardware (e.g., peripheral device interface 38, PCIe controller 304a, 304b, control module 306a, 306b, wake module 308a, 308b, power module 310a, 310b, clock module 312a, 312b, I/O control module 316a, 316b, LTSSM 400), in software (e.g., control module 306a, 306b, wake module 308a, 308b, power module 310a, 310b, clock module 312a, 312b, I/O control module 316a, 316b, LTSSM 400) executing in a processor (e.g., processor 14, 210, PCIe controller 304a, 304b), or in a combination of a software-configured processor and dedicated hardware that includes other individual components, such as various memories/caches (e.g., memory 16, 24, 36, memory subsystem 212, PCIe configuration registers 314a, 314b, memory 320, 334) and various memory/cache controllers. In order to encompass the alternative configurations enabled in various embodiments, the hardware implementing the method 520 is referred to herein as a "PCIe control device."

In block 522, the PCIe control device may retrieve PCIe link configuration data from a memory for a PCIe link in a fast recovery low power state of a link training status and state machine (LTSSM). Means for performing the operations in block 512 may include the PCIe controller and the memory.

In block 524, the PCIe control device may re-initialize the PCIe link using the PCIe link configuration data retrieved from the memory for the PCIe link. In some embodiments, re-initializing the PCIe link using the PCIe link configuration data retrieved from the memory for the PCIe link may include re-initializing the PCIe link in a recovery state of the LTSSM, and transitioning the PCIe link from the recovery state of the LTSSM to an active state of the LTSSM. Means for performing the operations in block 512 may include the PCIe controller.

In block 526, the PCIe control device may maintain the PCIe link configuration data in the memory for the PCIe link in the fast recovery low power state of the LTSSM by providing auxiliary power to PCIe configuration registers for the PCIe controller. The operations in block 526 may encompass the operations in blocks 512 and 514 of the method 500 as described. Means for performing the operations in block 512 may include the PCIe controller, the control module, the I/O control module, the power module and/or the clock module.

Figure 6:
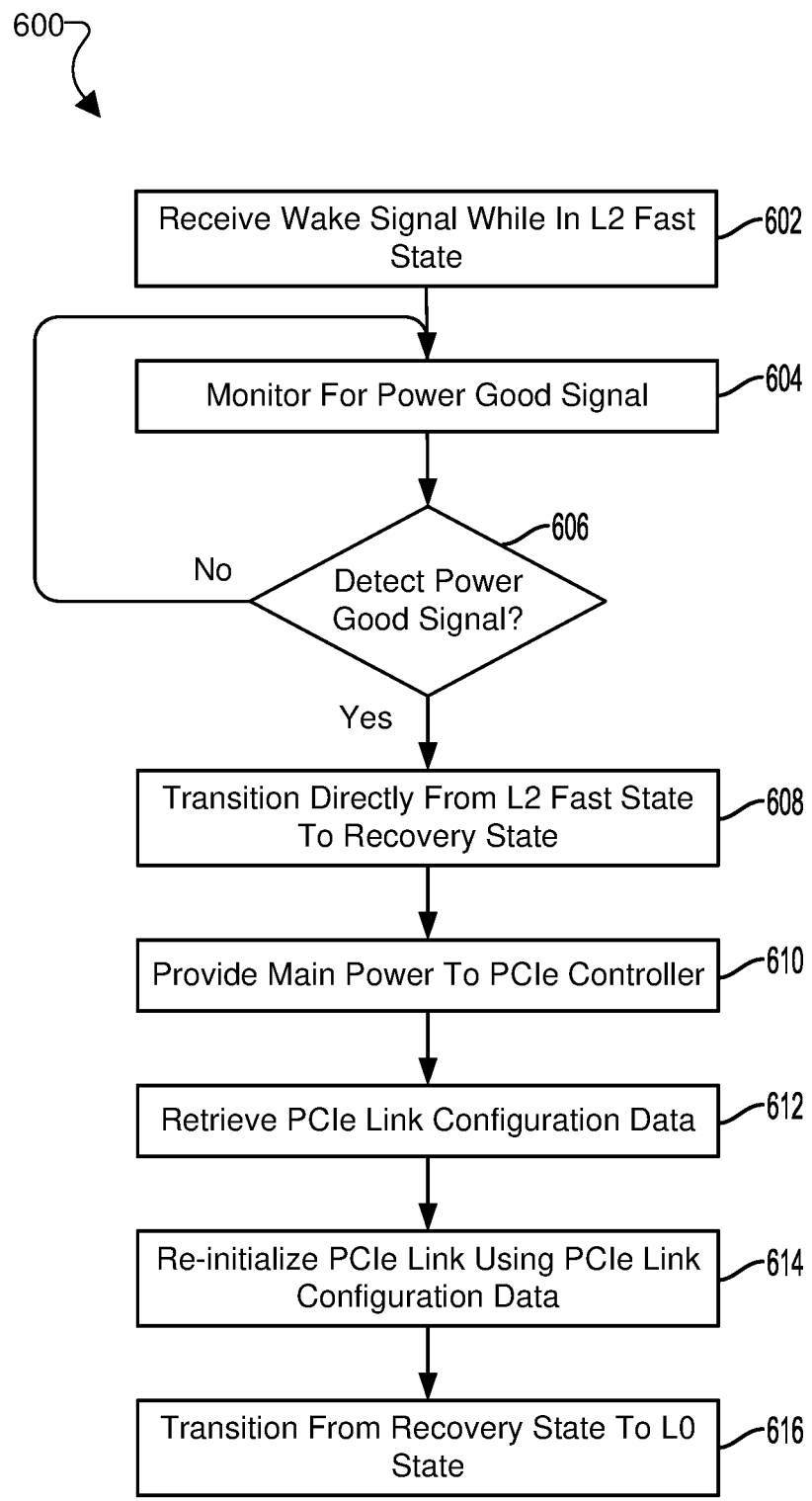
FIG. 6 is a process flow diagram illustrating a method for implementing reduced latency PCIe L2 link state transition according to an embodiment.

FIG. 6 illustrates a method 600 for implementing reduced latency PCIe L2 link state transition according to an embodiment. With reference to FIGS. 1-6, the method 600 may be implemented in a computing device (e.g., computing device 10, SoC 12, peripheral device 40, 202, 204, 206, 208, 210, 212, 214, PCIe enabled device 302, 330), in hardware (e.g., peripheral device interface 38, PCIe controller 304a, 304b, control module 306a, 306b, wake module 308a, 308b, power module 310a, 310b, clock module 312a, 312b, I/O control module 316a, 316b, LTSSM 400), in software (e.g., control module 306a, 306b, wake module 308a, 308b, power module 310a, 310b, clock module 312a, 312b, I/O control module 316a, 316b, LTSSM 400) executing in a processor (e.g., processor 104, 210, PCIe controller 304a, 304b), or in a combination of a software-configured processor and dedicated hardware that includes other individual components, such as various memories/caches (e.g., memory 16, 24, 36 memory subsystem 212, PCIe configuration registers 314a, 314b, memory 320, 334) and various memory/cache controllers. In order to encompass the alternative configurations enabled in various embodiments, the hardware implementing the method 600 is referred to herein as a "PCIe control device."

In block 602, the PCIe control device may receive a wake signal while in a fast recovery link suspend/sleep state (e.g., L2 fast link state). The wake signal may trigger the PCIe control device to transition a PCIe controller (e.g., PCIe controller 304a, 304b in FIG. 3) associated with the PCIe control device to a higher power state than the link suspend/sleep state (e.g., L2 fast link state). The higher power state may be a link active state (e.g., L0 link state). The wake signal may be a Beacon signal (using in-band signaling) and/or a WAKE #signal (using sideband signaling). The wake signal may be received from another PCIe controller. In some embodiments, the PCIe control device receiving the wake signal while in the fast recovery link suspend/sleep state (e.g., L2 fast link state) in block 602 may be, for example, the PCIe controller, an I/O control module (e.g., I/O control module 316a, 316b) and/or a wake module (e.g., wake module 308a, 308b). Means for performing the operations in block 602 may include the PCIe controller, an I/O control module (e.g., I/O control module 316a, 316b) and/or a wake module (e.g., wake module 308a, 308b).

In block 604, the PCIe control device may monitor for a power good signal. The power good signal may be configured to indicate to the PCIe control device receiving the power good signal that a stable voltage of main power source is to be provided to components of the PCIe control device. The components of the PCIe control device may include the control module, the I/O control module, the wake module, a clock module (e.g., clock module 312a, 312b in FIG. 3), a power module (e.g., power module 310a, 310b in FIG. 3), and/or PCIe configuration registers (e.g., PCIe configuration registers 314a, 314b in FIG. 3). In some embodiments, the PCIe control device monitoring for the power good signal in block 604 may be, for example, the PCIe controller, the I/O control module, and/or the wake module. Means for performing the operations in block 604 may include the PCIe controller, an I/O control module (e.g., I/O control module 316a, 316b) and/or a wake module (e.g., wake module 308a, 308b).

In determination block 606, the PCIe control device may determine whether there is a power good signal. The PCIe control device may receive the power good signal from the other PCIe controller and determine there is a power good signal in response to receiving the power good signal. Means for performing the operations in block 606 may include the PCIe controller, an I/O control module (e.g., I/O control module 316a, 316b) and/or a wake module (e.g., wake module 308a, 308b).

In response to determining that there is not a power good signal (i.e., determination block 606="No"), the PCIe control device may monitor for the power good signal in block 604 and determine whether there is a power good signal in determination block 606. In some embodiments, the PCIe control device determining whether there is a power good signal in determination block 606 may be, for example, the PCIe controller, the I/O control module, and/or the wake module.

In response to determining that there is a power good signal (i.e., determination block 606="Yes"), the PCIe control device may transition from the fast recovery link suspend/sleep state (e.g., L2 fast link state) to a link recovery state in block 608. Transitioning between the states may include signaling to components of the PCIe controller associated with the PCIe control device of the state change. The components may include the control module, the I/O control module, the wake module, the clock module, and/or the power module. The signals may prompt the components to prepare for the state change and or implement functions to conduct the state change, such as those described herein for blocks 610-614. In some embodiments, the PCIe control device transitioning from the fast recovery link suspend/sleep state (e.g., L2 fast link state) to the link recovery state in block 608 may be, for example, the PCIe controller, the I/O control module, and/or the wake module. Means for performing the operations in block 608 may include the PCIe controller, an I/O control module (e.g., I/O control module 316a, 316b) and/or a wake module (e.g., wake module 308a, 308b).

In block 610, the PCIe control device may provide main power from a main power source to the PCIe controller associated with the PCIe control device. Providing main power may include providing and/or regulating a main power source to at least portions of the PCIe controller associated with the PCIe control device. For example, the PCIe control device may control and/or signal to the power module to provide and/or regulate main power from the main power source to the control module, the I/O control module, the wake module, and/or the PCIe configuration registers. The PCIe control device may similarly control and/or signal to the clock module to provide, or ungate, clock signals to the control module, the wake module, and/or the I/O control module. In some embodiments, the PCIe control device providing main power and/or clock signals to the PCIe controller associated with the PCIe control device in block 610 may be, for example, the PCIe controller, the wake module, the power module, and/or the clock module. Means for performing the operations in block 610 may include the PCIe controller, an I/O control module (e.g., I/O control module 316a, 316b) and/or a wake module (e.g., wake module 308a, 308b).

In block 612, the PCIe control device may retrieve data detailing configuration of a PCIe link (e.g., PCIe link 340 in FIG. 3) for the PCIe control device. The data may be retrieved from the PCIe configuration registers or from memory locations referenced by the PCIe configuration registers. In some embodiments, the PCIe control device retrieving the data detailing configuration of the PCIe link for the PCIe control device in block 612 may be, for example, the PCIe controller, the control module, the I/O control module, and/or the wake module. Means for performing the operations in block 612 may include the PCIe controller, an I/O control module (e.g., I/O control module 316a, 316b) and/or a wake module (e.g., wake module 308a, 308b).

In block 614, the PCIe control device may re-initialize the PCIe link using the data detailing configuration of a PCIe link for the PCIe control device. The PCIe control device may implement recovery state functions, that may enable the PCIe control device to communicate between other PCIe controllers to re-initialize the PCIe link. Using the data detailing configuration of the PCIe link, the PCIe control device may implement initialization functions without needing to discover the data for initialization of the PCIe link. The PCIe control device may implement recovery state functions, that may enable the PCIe control device to send and receive data using the re-initialized PCIe link, including, for example, a lane number and/or previously supported data rate(s). The recovery state functions may enable the re-initialized PCIe link to change the data rate of operation, re-establish bit lock, symbol lock, block alignment, and/or lane-to-lane de-skew. In some embodiments, the PCIe control device re-initializing the PCIe link using the data detailing configuration of a PCIe link for the PCIe control device in block 614 may be, for example, the PCIe controller, the control module, the I/O control module, and/or the wake module. Means for performing the operations in block 614 may include the PCIe controller, an I/O control module (e.g., I/O control module 316a, 316b) and/or a wake module (e.g., wake module 308a, 308b).

In block 616, the PCIe control device may transition from the recovery state to the link active state (e.g., L0 link state). Transitioning between the states may include signaling to components of the PCIe controller associated with the PCIe control device of the state change. The components may include the control module, the I/O control module, the wake module, the clock module, and/or the power module. The signals may prompt the components to prepare for the state change. For example, the components may retrieve state information to implement functions of the link active state (e.g., L0 link state). In some embodiments, the PCIe control device transitioning from the recovery state to the link active state (e.g., L0 link state) in block 616 may be, for example, the PCIe controller, the control module, the I/O control module, the clock module, and/or the power module. Means for performing the operations in block 616 may include the PCIe controller, an I/O control module (e.g., I/O control module 316a, 316b) and/or a wake module (e.g., wake module 308a, 308b).

Figure 7:
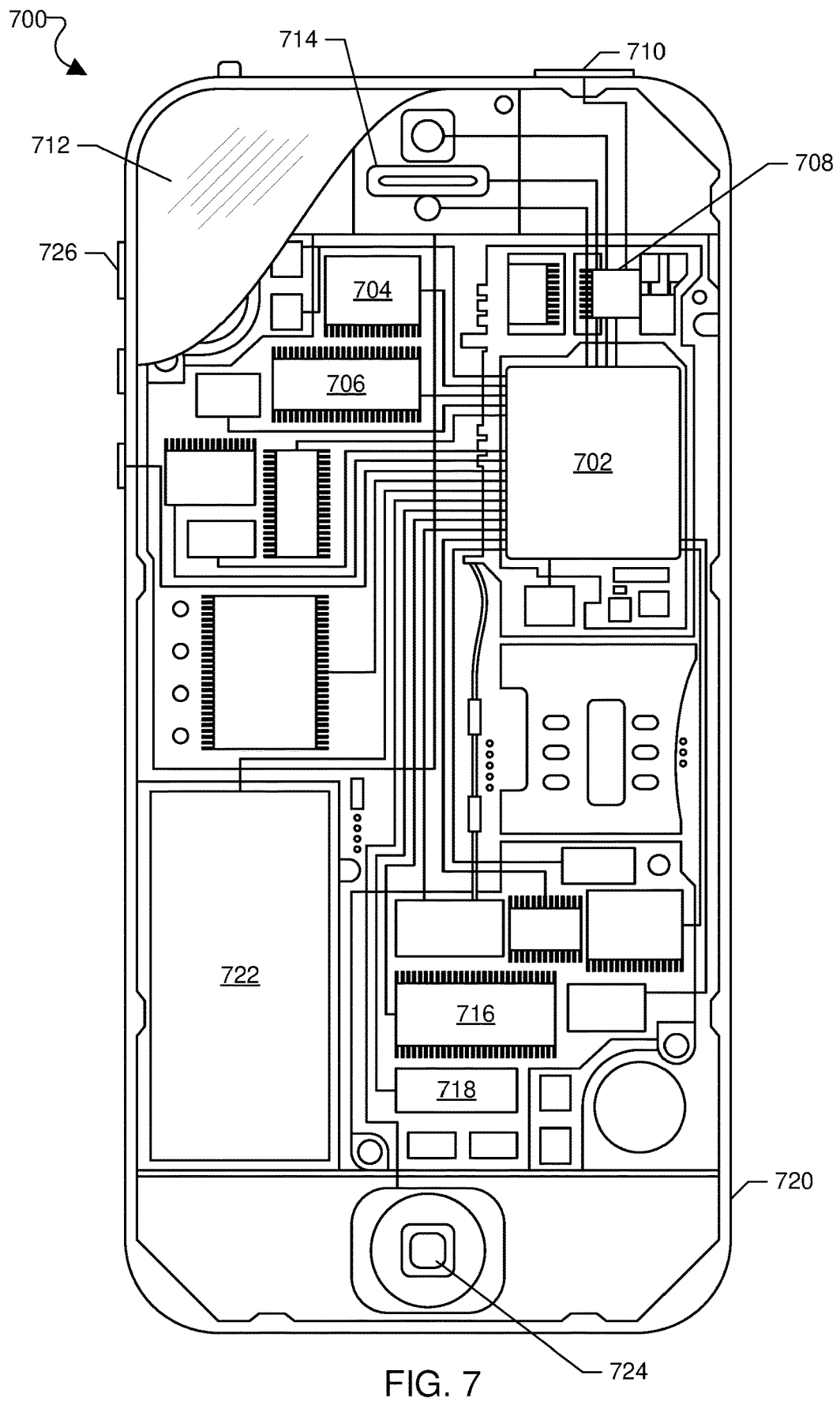
FIG. 7 is a component block diagram illustrating an example mobile computing device suitable for implementing various embodiments.

A system in accordance with the various embodiments (including, but not limited to, embodiments described above with reference to FIGS. 1-6) may be implemented in a wide variety of computing systems including mobile computing devices, an example of which suitable for use with the various embodiments is illustrated in FIG. 7. The mobile computing device 700 may include a processor 702 coupled to a touchscreen controller 704 and an internal memory 706. The processor 702 may be one or more multicore integrated circuits designated for general or specific processing tasks. The internal memory 706 may be volatile or non-volatile memory, and may also be secure and/or encrypted memory, or unsecure and/or unencrypted memory, or any combination thereof. Examples of memory types that can be leveraged include but are not limited to DDR, Low-Power DDR (LPDDR), Graphics DDR (GDDR), WIDEIO, RAM, Static RAM (SRAM), Dynamic RAM (DRAM), Parameter RAM (P-RAM), Resistive RAM (R-RAM), Magnetoresistive RAM (M-RAM), Spin-Transfer Torque RAM (STT-RAM), and embedded DRAM. The touchscreen controller 704 and the processor 702 may also be coupled to a touchscreen panel 712, such as a resistive-sensing touchscreen, capacitive-sensing touchscreen, infrared sensing touchscreen, etc. Additionally, the display of the mobile computing device 700 need not have touch screen capability.

The mobile computing device 700 may have one or more radio signal transceivers 708 (e.g., Peanut, Bluetooth, Zig-Bee, Wi-Fi, RF radio) and antennae 710, for sending and receiving communications, coupled to each other and/or to the processor 702. The transceivers 708 and antennae 710 may be used with the above-mentioned circuitry to implement the various wireless transmission protocol stacks and interfaces. The mobile computing device 700 may include a cellular network wireless modem chip 716 that enables communication via a cellular network and is coupled to the processor.

The mobile computing device 700 may include a peripheral device connection interface 718 coupled to the processor 702. The peripheral device connection interface 718 may be singularly configured to accept one type of connection, or may be configured to accept various types of physical and communication connections, common or proprietary, such as Universal Serial Bus (USB), FireWire, Thunderbolt, or PCIe. The peripheral device connection interface 718 may also be coupled to a similarly configured peripheral device connection port (not shown).

The mobile computing device 700 may also include speakers 714 for providing audio outputs. The mobile computing device 700 may also include a housing 720, constructed of a plastic, metal, or a combination of materials, for containing all or some of the components described herein. The mobile computing device 700 may include a power source 722 coupled to the processor 702, such as a disposable or rechargeable battery. The rechargeable battery may also be coupled to the peripheral device connection port to receive a charging current from a source external to the mobile computing device 700. The mobile computing device 700 may also include a physical button 724 for receiving user inputs. The mobile computing device 700 may also include a power button 726 for turning the mobile computing device 700 on and off.

Figure 8:
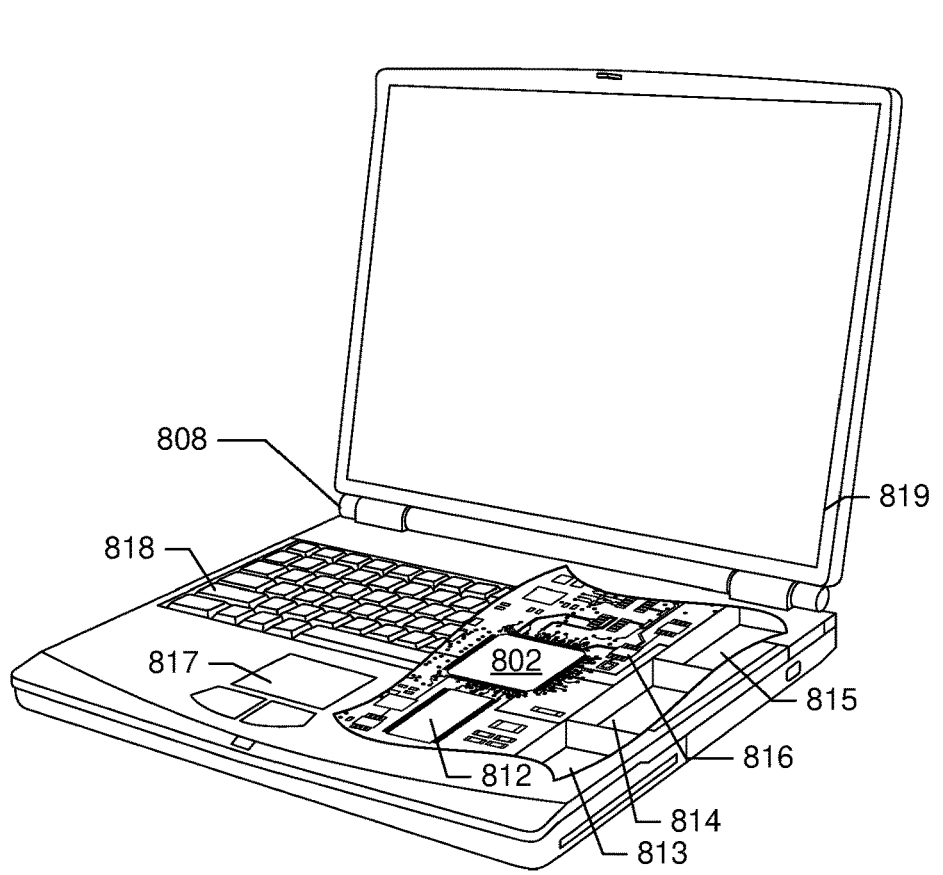
FIG. 8 is a component block diagram illustrating an example mobile computing device suitable for implementing various embodiments.

A system in accordance with the various embodiments (including, but not limited to, embodiments described above with reference to FIGS. 1-6) may be implemented in a wide variety of computing systems include a laptop computer 800 an example of which is illustrated in FIG. 8. Many laptop computers include a touchpad touch surface 817 that serves as the computer's pointing device, and thus may receive drag, scroll, and flick gestures similar to those implemented on computing devices equipped with a touch screen display and described above. A laptop computer 800 will typically include a processor 802 coupled to volatile memory 812 and a large capacity nonvolatile memory, such as a disk drive 813 of Flash memory. Additionally, the computer 800 may have one or more antenna 808 for sending and receiving electromagnetic radiation that may be connected to a wireless data link and/or cellular telephone transceiver 816 coupled to the processor 802. The computer 800 may also include a floppy disc drive 814 and a compact disc (CD) drive 815 coupled to the processor 802. In a notebook configuration, the computer housing includes the touchpad 817, the keyboard 818, and the display 819 all coupled to the processor 802. Other configurations of the computing device may include a computer mouse or trackball coupled to the processor (e.g., via a USB input) as are well known, which may also be used in conjunction with the various embodiments.

Figure 9:
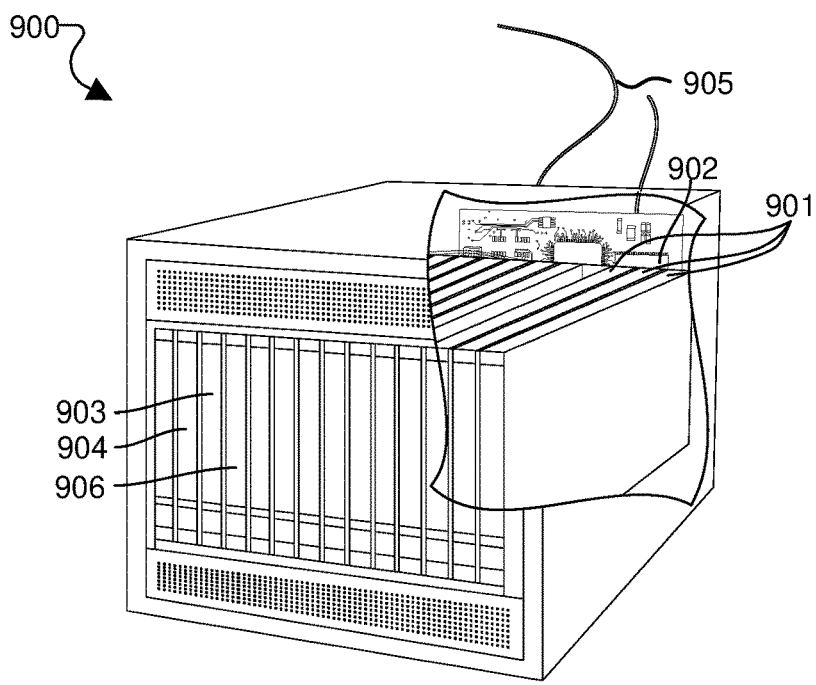
FIG. 9 is a component block diagram illustrating an example server suitable for implementing various embodiments.

A system in accordance with the various embodiments (including, but not limited to, embodiments described above with reference to FIGS. 1-6) may also be implemented in fixed computing systems, such as any of a variety of commercially available servers. An example server 900 is illustrated in FIG. 9. Such a server 900 typically includes one or more multicore processor assemblies 901 coupled to volatile memory 902 and a large capacity nonvolatile memory, such as a disk drive 904. As illustrated in FIG. 9, multicore processor assemblies 901 may be added to the server 900 by inserting them into the racks of the assembly. The server 900 may also include a floppy disc drive, compact disc (CD) or digital versatile disc (DVD) disc drive 906 coupled to the processor 901. The server 900 may also include network access ports 903 coupled to the multicore processor assemblies 901 for establishing network interface connections with a network 905, such as a local area network coupled to other broadcast system computers and servers, the Internet, the public switched telephone network, and/or a cellular data network (e.g., CDMA, TDMA, GSM, PCS, 3G, 4G, LTE, 5G or any other type of cellular data network).

Implementation examples are described in the following paragraphs. While some of the following implementation examples are described in terms of example systems, devices, or methods, further example implementations may include: the example systems or devices discussed in the following paragraphs implemented as a method executing operations of the example systems or devices, the example systems, devices, or methods discussed in the following paragraphs implemented by a computing device comprising a processing device and/or a Peripheral Component Interconnect Express (PCIe) controller configured with processing device-executable instructions to perform operations of the example systems, devices, or methods; a Peripheral Component Interconnect Express (PCIe) controller configured to perform operations of the example systems, devices, or methods; a computing device comprising a configured to perform operations of the example systems, devices, or methods; the example systems, devices, or methods discussed in the following paragraphs implemented by a computing device including means for performing functions of the example systems, devices, or methods; and the example systems, devices, or methods discussed in the following paragraphs implemented as a non-transitory processor-readable storage medium having stored thereon processor-executable instructions configured to cause a processor of a computing device to perform the operations of the example systems, devices, or methods.

Example 1. A method for implementing Peripheral Component Interconnect Express (PCIe) link state transition by a computing device, including: retrieving, by a PCIe controller, PCIe link configuration data from a memory for a PCIe link in a fast recovery low power state of a link training status and state machine (LTSSM); and re-initializing, by the PCIe controller, the PCIe link using the PCIe link configuration data retrieved from the memory for the PCIe link.

Example 2. The method of example 1, in which re-initializing the PCIe link using the PCIe link configuration data retrieved from the memory for the PCIe link includes re-initializing the PCIe link in the recovery state of the LTSSM, the method further including transitioning the PCIe link from the recovery state of the LTSSM to an active state of the LTSSM.

Example 3. The method of either of examples 1 or 2, further including maintaining the PCIe link configuration data in the memory for the PCIe link in the fast recovery low power state of the LTSSM by providing auxiliary power to PCIe configuration registers for the PCIe controller.

Example 4. The method of any of examples 1-3, further including: receiving, by the PCIe controller, a wake signal for the PCIe link in the fast recovery low power state of the LTSSM; monitoring, by the PCIe controller, for a power good signal configured to indicate a stable voltage for a main power source to the PCIe controller in response to receiving the wake signal; and receiving, by the PCIe controller, the power good signal, in which retrieving the PCIe link configuration data from the memory for the PCIe link in the fast recovery low power state of the LTSSM includes retrieving the PCIe link configuration data from the memory for the PCIe link in the fast recovery low power state of the LTSSM in response to receiving the power good signal.

Example 5. The method of any of examples 1-4, further including: receiving, by the PCIe controller, a low power state signal for the PCIe link in an active state for the LTSSM; checking a fast recovery low power state enable value for the PCIe controller configured to indicate whether the fast recovery low power state is enabled for the PCIe controller; and transitioning the PCIe link in the active state for the LTSSM to the PCIe link in the fast recovery low power state for the LTSSM in response to the fast recovery low power state enable value for the PCIe controller indicating that the fast recovery low power state is enabled for the PCIe controller.

Example 6. The method of example 5, further including maintaining the PCIe link configuration data in the memory for the PCIe link in the fast recovery low power state of the LTSSM by providing auxiliary power to PCIe configuration registers for the PCIe controller in response to the fast recovery low power state enable value for the PCIe controller indicating that the fast recovery low power state is enabled for the PCIe controller.

Example 7. A Peripheral Component Interconnect Express (PCIe) controller configured to transition a PCIe link from an L2 Fast link state to a Recovery link state.

Example 8. The PCIe controller of example 7, further configured to transition the PCIe link from an L2/L3 Ready link state to the L2 Fast link state.

Example 9. The PCIe controller of example 7, further configured to transition the PCIe link from an L0 link state to the L2 Fast link state, and transition the PCIe link from the Recovery link state to the to the L0 link state.

Example 10. The PCIe controller of any of examples 7 and 9, in which transitioning the PCIe link from the L0 link state to the L2 Fast link state may include transitioning the PCIe link from the L0 link state to an L2/L3 Ready link state, and transitioning the PCIe link from the L2/L3 Ready link state to the L2 Fast link state.

Computer program code or "program code" for execution on a programmable processor for carrying out operations of the various embodiments may be written in a high level programming language such as C, C++, C #, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various embodiments may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to the embodiments and implementations described herein, but is to be accorded the widest scope consistent with the following claims and the principles and novel features disclosed herein.

What is claimed is:

1. A method for implementing Peripheral Component Interconnect Express (PCIe) link state transition by a computing device, comprising:
   retrieving, by a PCIe controller, PCIe link configuration data from a memory for a PCIe link in a fast recovery low power state of a link training status and state machine (LTSSM), wherein the fast recovery low power state is a non-active-state power management state; and
   re-initializing, by the PCIe controller, the PCIe link using the PCIe link configuration data retrieved from the memory for the PCIe link.

2. The method of claim 1, wherein re-initializing the PCIe link using the PCIe link configuration data retrieved from the memory for the PCIe link comprises re-initializing the PCIe link in the recovery state of the LTSSM, the method further comprising transitioning the PCIe link from the recovery state of the LTSSM to an active state of the LTSSM.

3. The method of claim 1, further comprising maintaining the PCIe link configuration data in the memory for the PCIe link in the fast recovery low power state of the LTSSM by providing auxiliary power to PCIe configuration registers for the PCIe controller.

4. The method of claim 1, further comprising:
   receiving, by the PCIe controller, a wake signal for the PCIe link in the fast recovery low power state of the LTSSM;
   monitoring, by the PCIe controller, for a power good signal configured to indicate a stable voltage for a main power source to the PCIe controller in response to receiving the wake signal; and
   receiving, by the PCIe controller, the power good signal, wherein retrieving the PCIe link configuration data from the memory for the PCIe link in the fast recovery low power state of the LTSSM comprises retrieving the PCIe link configuration data from the memory for the PCIe link in the fast recovery low power state of the LTSSM in response to receiving the power good signal.

5. The method of claim 1, further comprising:
   receiving, by the PCIe controller, a low power state signal for the PCIe link in an active state for the LTSSM;
   checking a fast recovery low power state enable value for the PCIe controller configured to indicate whether the fast recovery low power state is enabled for the PCIe controller; and
   transitioning the PCIe link in the active state for the LTSSM to the PCIe link in the fast recovery low power state for the LTSSM in response to the fast recovery low power state enable value for the PCIe controller indicating that the fast recovery low power state is enabled for the PCIe controller.

6. The method of claim 5, further comprising maintaining the PCIe link configuration data in the memory for the PCIe link in the fast recovery low power state of the LTSSM by providing auxiliary power to PCIe configuration registers for the PCIe controller in response to the fast recovery low power state enable value for the PCIe controller indicating that the fast recovery low power state is enabled for the PCIe controller.

7. A computing device, comprising:
   a memory; and
   a Peripheral Component Interconnect Express (PCIe) controller configured to:
      retrieve PCIe link configuration data from the memory for a PCIe link in a fast recovery low power state of a link training status and state machine (LTSSM), wherein the fast recovery low power state is a non-active-state power management state; and
      re-initialize the PCIe link using the PCIe link configuration data retrieved from the memory for the PCIe link.

8. The computing device of claim 7, wherein the PCIe controller is further configured to:
   re-initialize the PCIe link using the PCIe link configuration data retrieved from the memory for the PCIe link by re-initializing the PCIe link in the recovery state of the LTSSM; and
   transition the PCIe link from the recovery state of the LTSSM to an active state of the LTSSM.

9. The computing device of claim 7, wherein the PCIe controller is further configured to maintain the PCIe link configuration data in the memory for the PCIe link in the fast recovery low power state of the LTSSM by providing auxiliary power to PCIe configuration registers for the PCIe controller.

10. The computing device of claim 7, wherein the PCIe controller is further configured to:
receive a wake signal for the PCIe link in the fast recovery low power state of the LTSSM;
monitor for a power good signal configured to indicate a stable voltage for a main power source to the PCIe controller in response to receiving the wake signal;
receive the power good signal; and
retrieve the PCIe link configuration data from the memory for the PCIe link in the fast recovery low power state of the LTSSM by retrieving the PCIe link configuration data from the memory for the PCIe link in the fast recovery low power state of the LTSSM in response to receiving the power good signal.

11. The computing device of claim 7, wherein the PCIe controller is further configured to:
receive a low power state signal for the PCIe link in an active state for the LTSSM;
check a fast recovery low power state enable value for the PCIe controller configured to indicate whether the fast recovery low power state is enabled for the PCIe controller; and
transition the PCIe link in the active state for the LTSSM to the PCIe link in the fast recovery low power state for the LTSSM in response to the fast recovery low power state enable value for the PCIe controller indicating that the fast recovery low power state is enabled for the PCIe controller.

12. The computing device of claim 11, wherein the PCIe controller is further configured to maintain the PCIe link configuration data in the memory for the PCIe link in the fast recovery low power state of the LTSSM by providing auxiliary power to PCIe configuration registers for the PCIe controller in response to the fast recovery low power state enable value for the PCIe controller indicating that the fast recovery low power state is enabled for the PCIe controller.

13. A Peripheral Component Interconnect Express (PCIe) controller configured to:
retrieve PCIe link configuration data from a memory for a PCIe link in a fast recovery low power state of a link training status and state machine (LTSSM), wherein the fast recovery low power state is a non-active-state power management state; and
re-initialize the PCIe link using the PCIe link configuration data retrieved from the memory for the PCIe link.

14. The PCIe controller of claim 13, wherein the PCIe controller is further configured to:
re-initialize the PCIe link using the PCIe link configuration data retrieved from the memory for the PCIe link by re-initializing the PCIe link in the recovery state of the LTSSM; and
transition the PCIe link from the recovery state of the LTSSM to an active state of the LTSSM.

15. The PCIe controller of claim 13, wherein the PCIe controller is further configured to maintain the PCIe link configuration data in the memory for the PCIe link in the fast recovery low power state of the LTSSM by providing auxiliary power to PCIe configuration registers for the PCIe controller.

16. The PCIe controller of claim 13, wherein the PCIe controller is further configured to:
receive a wake signal for the PCIe link in the fast recovery low power state of the LTSSM;
monitor for a power good signal configured to indicate a stable voltage for a main power source to the PCIe controller in response to receiving the wake signal;
receive the power good signal; and
retrieve the PCIe link configuration data from the memory for the PCIe link in the fast recovery low power state of the LTSSM by retrieving the PCIe link configuration data from the memory for the PCIe link in the fast recovery low power state of the LTSSM in response to receiving the power good signal.

17. The PCIe controller of claim 13, wherein the PCIe controller is further configured to:
receive a low power state signal for the PCIe link in an active state for the LTSSM;
check a fast recovery low power state enable value for the PCIe controller configured to indicate whether the fast recovery low power state is enabled for the PCIe controller; and
transition the PCIe link in the active state for the LTSSM to the PCIe link in the fast recovery low power state for the LTSSM in response to the fast recovery low power state enable value for the PCIe controller indicating that the fast recovery low power state is enabled for the PCIe controller.

18. The PCIe controller of claim 17, wherein the PCIe controller is further configured to maintain the PCIe link configuration data in the memory for the PCIe link in the fast recovery low power state of the LTSSM by providing auxiliary power to PCIe configuration registers for the PCIe controller in response to the fast recovery low power state enable value for the PCIe controller indicating that the fast recovery low power state is enabled for the PCIe controller.

19. A computing device, comprising:
means for retrieving Peripheral Component Interconnect Express (PCIe) link configuration data from a memory for a PCIe link in a fast recovery low power state of a link training status and state machine (LTSSM), wherein the fast recovery low power state is a non-active-state power management state; and
means for re-initializing the PCIe link using the PCIe link configuration data retrieved from the memory for the PCIe link.

20. The computing device of claim 19, wherein means for re-initializing the PCIe link using the PCIe link configuration data retrieved from the memory for the PCIe link comprises means for re-initializing the PCIe link in the recovery state of the LTSSM,
the computing device further comprising means for transitioning the PCIe link from the recovery state of the LTSSM to an active state of the LTSSM.

21. The computing device of claim 19, further comprising means for maintaining the PCIe link configuration data in the memory for the PCIe link in the fast recovery low power state of the LTSSM by providing auxiliary power to PCIe configuration registers for a PCIe controller.

22. The computing device of claim 19, further comprising:
means for receiving a wake signal for the PCIe link in the fast recovery low power state of the LTSSM;
means for monitoring for a power good signal configured to indicate a stable voltage for a main power source to a PCIe controller in response to receiving the wake signal; and
means for receiving the power good signal,
wherein means for retrieving the PCIe link configuration data from the memory for the PCIe link in the fast recovery low power state of the LTSSM comprises means for retrieving the PCIe link configuration data from the memory for the PCIe link in the fast recovery low power state of the LTSSM in response to receiving the power good signal.

23. The computing device of claim 19, further comprising:
  means for receiving a low power state signal for the PCIe link in an active state for the LTSSM;
  means for checking a fast recovery low power state enable value for a PCIe controller configured to indicate whether the fast recovery low power state is enabled for the PCIe controller; and
  means for transitioning the PCIe link in the active state for the LTSSM to the PCIe link in the fast recovery low power state for the LTSSM in response to the fast recovery low power state enable value for the PCIe controller indicating that the fast recovery low power state is enabled for the PCIe controller.

24. The computing device of claim 23, further comprising means for maintaining the PCIe link configuration data in the memory for the PCIe link in the fast recovery low power state of the LTSSM by providing auxiliary power to PCIe configuration registers for the PCIe controller in response to the fast recovery low power state enable value for the PCIe controller indicating that the fast recovery low power state is enabled for the PCIe controller.

25. A Peripheral Component Interconnect Express (PCIe) controller configured to transition a PCIe link from an L2 Fast link state to a Recovery link state, wherein the L2 Fast link state is a non-active-state power management state.

26. The PCIe controller of claim 25, further configured to transition the PCIe link from an L2/L3 Ready link state to the L2 Fast link state.

27. The PCIe controller of claim 25, further configured to:
  transition the PCIe link from an L0 link state to the L2 Fast link state; and
  transition the PCIe link from the Recovery link state to the to the L0 link state.

28. The PCIe controller of claim 27, wherein transitioning the PCIe link from the L0 link state to the L2 Fast link state comprises:
  transitioning the PCIe link from the L0 link state to an L2/L3 Ready link state; and
  transitioning the PCIe link from the L2/L3 Ready link state to the L2 Fast link state.

* * * * *